US012184982B2

(12) United States Patent
Agrawal et al.

(10) Patent No.: US 12,184,982 B2
(45) Date of Patent: Dec. 31, 2024

(54) AUTONOMOUS FORM FACTOR CONTROL OF A FOLDABLE MOBILE DEVICE

(71) Applicant: Motorola Mobility LLC, Chicago, IL (US)

(72) Inventors: Amit Kumar Agrawal, Bangalore (IN); Bill Ryan, Libertyville, IL (US); Nigil George Valikodath, Elmhurst, IL (US); Thomas Gitzinger, Libertyville, IL (US)

(73) Assignee: Motorola Mobility LLC, Chicago, IL (US)

( * ) Notice: Subject to any disclaimer, the term of this patent is extended or adjusted under 35 U.S.C. 154(b) by 98 days.

(21) Appl. No.: 18/123,519

(22) Filed: Mar. 20, 2023

(65) Prior Publication Data
US 2024/0323535 A1    Sep. 26, 2024

(51) Int. Cl.
| | | |
|---|---|---|
| H04N 23/695 | (2023.01) | |
| H04M 1/02 | (2006.01) | |
| H04N 23/51 | (2023.01) | |
| H04N 23/53 | (2023.01) | |
| H04N 23/61 | (2023.01) | |
| H04N 7/18 | (2006.01) | |

(52) U.S. Cl.
CPC ........ *H04N 23/695* (2023.01); *H04M 1/0218* (2013.01); *H04M 1/0264* (2013.01); *H04N 23/51* (2023.01); *H04N 23/53* (2023.01); *H04N 23/61* (2023.01); *H04M 2250/52* (2013.01); *H04N 7/183* (2013.01)

(58) Field of Classification Search
None
See application file for complete search history.

(56) References Cited

U.S. PATENT DOCUMENTS

| | | |
|---|---|---|
| 7,876,199 B2 | 1/2011 | Caine |
| 9,020,571 B2 | 4/2015 | Chi |
| 9,977,465 B2 | 5/2018 | Lee |

(Continued)

FOREIGN PATENT DOCUMENTS

| | | |
|---|---|---|
| CN | 115276698 A | 11/2022 |
| KR | 101044334 B1 | 7/2011 |
| WO | 2022263856 A1 | 12/2022 |

OTHER PUBLICATIONS

Russell, R. A., A Novel Differential Shape Memory Alloy Actuator for Position Control,. Robotica, (1995), 423-430, 13.

(Continued)

*Primary Examiner* — Eileen M Adams
(74) *Attorney, Agent, or Firm* — Kunzler Bean & Adamson

(57) ABSTRACT

An apparatus for autonomous form factor control of a foldable mobile device includes a processor that determines a current form factor of the foldable mobile device and senses a forward motion or a backward motion of a subject within a field of view of a camera of the device. In response to forward motion of a user, the processor raises a pointing elevation angle of the camera to maintaining the user within the field of view by autonomously controlling the hinge angle between the first device housing and the second device housing of the foldable mobile device and in response to backward motion the processor lowers the pointing elevation angle by autonomously using shape memory actuators to control the hinge angle in the direction determined based on the form factor.

20 Claims, 11 Drawing Sheets

(56) References Cited

U.S. PATENT DOCUMENTS

| | | | |
|---|---|---|---|
| 10,215,952 B2 | 2/2019 | Kamatani | |
| 10,289,165 B2 | 5/2019 | Miyamoto | |
| 2018/0324356 A1* | 11/2018 | Sarraju | ................... H04N 23/57 |
| 2018/0332163 A1* | 11/2018 | Park | .................... G06F 3/04842 |
| 2021/0195107 A1* | 6/2021 | Gorsica | ................ H04N 23/684 |
| 2022/0294939 A1 | 9/2022 | Kim | |
| 2023/0262317 A1* | 8/2023 | O'Leary | ............. H04L 65/1069 |

OTHER PUBLICATIONS

Paik, J. K. et al., A bidirectional shape memory alloy folding actuator,. Smart Materials and Structures, (2012), 21.

Gomes, A. et al., MorePhone: A study of actuated shape deformations for flexible thin-film smartphone notifications,. Conference on Human Factors in Computing Systems—Proceedings, (2013), 583-592.

Yarosh, S. et al., SqueezeBands: Mediated social touch using Shape Memory Alloy actuation,. Proceedings of the ACM on Human-Computer Interaction, (2017), 35041, 1.

Oh, H. U. et al., Smartphone CanSat for actualization of real-time streaming video calls using remote screen touch system with shape memory alloy actuator,. Transactions of the Japan Society for Aeronautical and Space Sciences, (2019), 256-264, 62.

Muthukumarana, S. et al., Touch me Gently: Recreating the Perception of Touch using a Shape-Memory Alloy Matrix,. Conference on Human Factors in Computing Systems—Proceedings, (2020), 20.

\* cited by examiner

Autonomous Form Factor Control

Ⓐ
Center 607　　　Exterior Facing Stand Mode 602

Ⓑ　　　　　Forward Motion 609

Ⓒ　Backward Motion 611

AUTONOMOUS FORM FACTOR CONTROL OF A FOLDABLE MOBILE DEVICE

FIELD

The subject matter disclosed herein relates to foldable imaging devices for use in video conferencing applications and more particularly relates to methods, apparatuses, and systems for autonomous form factor control of a foldable mobile device.

BACKGROUND

Various advances allow viewers of video communications to use mobile communication devices such as smart phones for making video calls or engaging in videoconferences. Friction hinges may allow a foldable mobile device with a built-in video cameras to be folded into a selected geometric form factor mode so that users can position themselves at a position and distance that is within the field of view of the video camera in order to see what the outgoing video feed looks like. Various systems may include software and electronics that control optical functions and video imaging processing but existing systems lack autonomous form factor control to change angles of a geometric form factor mode that has been selected.

BRIEF SUMMARY

An apparatus for autonomous form factor control of a foldable mobile device includes a foldable mobile device with a first device housing that is selectively pivotable about a hinge to a hinge angle relative to a second device housing for foldably positioning the foldable mobile device into a plurality of selected geometric form factors for capturing video of a subject.

The foldable mobile device includes an exterior display and one or more cameras in the first device housing including at least one exterior camera. The foldable mobile device include an interior display that stretches across an interior face of first device housing and the second device housing.

The foldable mobile device includes a processor; and a memory coupled to the processor, the memory comprising instructions executable by the processor to cause the apparatus to perform sensing a forward motion or a backward motion of a subject within a field of view of the one or more cameras in the first device housing.

In response to sensing the forward motion of the subject, raising a pointing elevation angle of the one or more cameras to facilitate maintaining the subject within the field of view by autonomously controlling the hinge angle between the first device housing and the second device housing.

In response to the backward motion of the subject, the processor performs lowering the pointing elevation angle of the one or more cameras to facilitate maintaining the subject within the field of view by autonomously controlling the hinge angle between the first device housing and the second device housing.

A system that includes the apparatus and a method for performing the functions of the apparatus are disclosed.

BRIEF DESCRIPTION OF THE DRAWINGS

A more particular description of the examples briefly described above will be rendered by reference to specific examples that are illustrated in the appended drawings. Understanding that these drawings depict only some examples and are not, therefore, to be considered to be limiting of scope, the examples will be described and explained with additional specificity and detail through the use of the accompanying drawings, in which.

DETAILED DESCRIPTION

Figure 1:
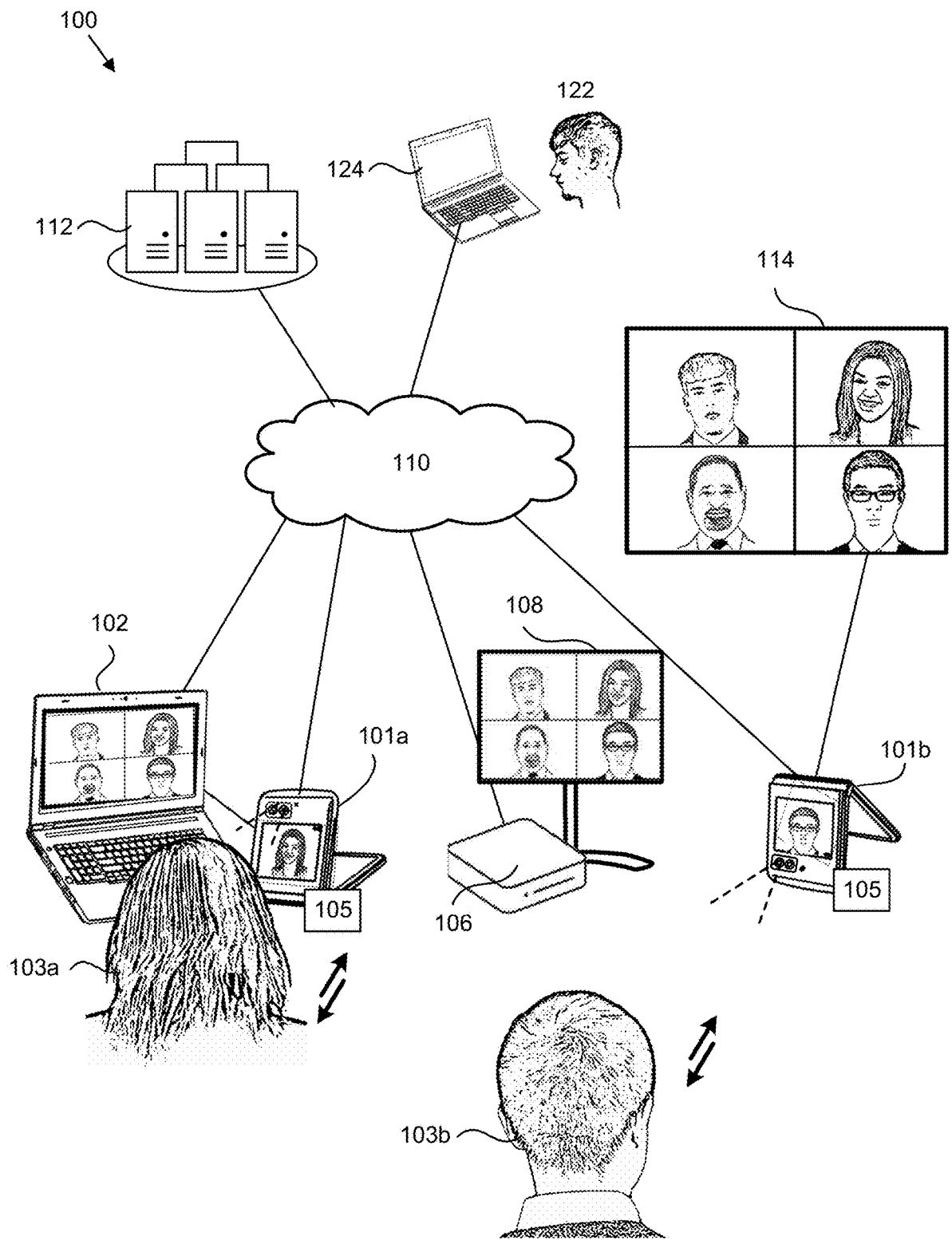
FIG. 1 is a schematic block diagram illustrating a system for autonomous form factor control of a foldable mobile device, according to one or more examples of the present disclosure.

As will be appreciated by one skilled in the art, aspects of the disclosure may be implemented as a system, a method, and/or a program product. Accordingly, examples may take the form of an entirely hardware implementation, an entirely software implementation (including firmware, resident software, micro-code, etc.) or an implementation combining software and hardware aspects that may all generally be referred to herein as a "circuit," "module" or "system." Furthermore, examples may take the form of a program product implemented in one or more computer readable storage devices storing machine-readable code, computer readable code, and/or program code, referred hereafter as code. The storage devices may be tangible, non-transitory, and/or non-transmission. In certain examples, the storage devices only employ signals for accessing code.

Various of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field-programmable gate arrays, programmable array logic, programmable logic devices or the like.

Modules may also be implemented in code and/or software for execution by various types of processors. For example, an identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module or controller.

Indeed, a module of code or may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that contains or stores a program for use by or in connection with an instruction execution system, apparatus, or device.

Code for carrying out operations for examples may be written in any combination of one or more programming languages including an object-oriented programming language such as Python, Ruby, R, Java, JavaScript, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). It may be noted that as used herein, the term "computer" may refer to any type or form of information handling device unless otherwise clear from context.

Reference throughout this specification to "one example," "an implementation," or similar language means that a particular feature, structure, or characteristic described in connection with the example is included in at least one implementation. Thus, appearances of the phrases "in one example," "in an example," and similar language throughout this specification may, but do not necessarily, all refer to the same example or implementation. Similarly, select aspects of the disclosure which are "according to one or more examples of the present disclosure" means that the selected aspects may be present in at least one example, may be present in more than one example, and may be present in all examples.

The terms "including," "comprising," "having," and variations thereof mean "including but not limited to," unless expressly specified otherwise. An enumerated listing of items does not imply that any or all of the items are mutually exclusive unless expressly specified otherwise. The terms "a," "an," and "the" also refer to "one or more" unless expressly specified otherwise. The term "and/or" indicates examples of one or more of the listed elements, with "A and/or B" indicating examples of element A alone, element B alone, or elements A and B taken together. Likewise, as used herein, the phrase "at least one of" indicates examples of one or more of the listed elements, with "at least one of A and B" indicating examples of element A alone, element B alone, or elements A and B taken together. In other words, with respect to listed elements, the terms "and/or", and "at least one of" indicate examples of any of the listed elements alone as well as examples with any combination of the listed elements.

Furthermore, the described features, structures, or characteristics of the examples may be combined in any suitable manner. In the following description, numerous specific details are provided, such as examples of programming, software modules, user selections, network transactions, database queries, database structures, hardware modules, hardware circuits, hardware chips, etc., to provide a thorough understanding of examples. One skilled in the relevant art will recognize, however, that examples may be practiced without one or more of the specific details, or with other methods, components, materials, and so forth. In other instances, well-known structures, materials, or operations are not shown or described in detail to avoid obscuring aspects of an example.

Aspects of the examples are described below with reference to schematic flowchart diagrams and/or schematic block diagrams of methods, apparatuses, systems, and program products according to examples. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other information handling device to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that is operable to direct a computer, an information processing device, or other device to function in a particular manner, such that the instructions stored in the storage device produce an article of manufacture including instructions which implement the function/act specified in the schematic flowchart diagrams and/or schematic block diagrams block or blocks.

The code may also be loaded on to a computer, an information processing device, or other device, to cause a series of operational steps to be performed on the computer, or information handling device to produce a computer implemented process such that the code which executes on the computer, the information processing device, or the other device, provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various examples. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding examples. Indeed, some arrows or other connectors may be used to indicate only the logical flow of the depicted example. For instance, an arrow may indicate a waiting or monitoring period of unspecified duration between enumerated steps of the depicted example. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate examples of like elements. Reference numbers in the figures may include a base number and/or a base number followed by a lowercase letter to refer to different individual elements. A reference to a base number may refer to various elements of the group of elements having the base number including those elements referenced by a base number followed by a lowercase letter, unless otherwise clear from the context.

It may be noted that throughout this disclosure, unless otherwise clear from context, where one or more components or structures of a particular type are disclosed such as one or more cameras, one or more processors, one or more actuators and so forth, in order to simplify explanatory examples, reference to such components or structures may be made in singular form in order to simplify the grammatical structure of the examples without necessarily implying any upper or lower limit as to the number of components or structure of any particular type used in any combination with other structures.

Overview and Introduction

Modern smart phones are equipped with some of the best digital cameras in the consumer market leading many consumers to rely increasingly on their smartphones for most of their photo and video needs. Such smart phones may combine the latest imaging sensors and lens component technologies to reveal fine details with excellent colors even in low light. They may include multiple cameras enabling them to automatically zoom in on a single user or subject without losing detail or to expand the field of view to capture more of a scene.

However, some consumers have still been using basic USB webcams or built-in webcams on laptops for all of their video calling needs involving a computer display or even when connecting to an external screen rather than using the superior video capture and processing features available in portable communication devices such as smartphones.

One reason may be that until advances such as flexible, optically clear, composite structures for foldable displays in mobile devices made it possible for users to quickly and conveniently position their smartphone into a geometric form factor suitable to capture video of themselves in a setting where they could view a larger external screen and at the same time make sure they were well centered within the field of view of the well-featured cameras on their mobile device. With smartphones that are not foldable into selected geometric form factors, it may be necessary to have a positionable stand in order to ensure that camera can be positioned at an angle the allows the user to stay within the field of view of the camera.

An example of a video feature useful for video using foldable mobile devices such as smartphones is subject tracking which is a feature that became available earlier on PCs with webcams. Various implementations of subject tracking using facial recognition. Some implementations of subject tracking uses smart software to recognize up to three faces in the same frame. Implementations of subject tracking may use features such as software panning or zooming to keep subjects centered in the frame.

However, existing systems rely on image processing and in some case on control of optics to perform subject tracking and subject tracking may be suboptimal or may fail altogether if the subject (e.g., the user) moves too close or too far away from the camera capturing the video. For example, one mobile device instruction manual states that subject tracking works best when subjects are within two meters from the device.

Although these video capture and subject tracking features are quite useful, the inventors of the subject matter disclosed herein have taken a surprising but forward looking approach to improve upon such features for foldable mobile devices. Instead of manually adjusting the geometric form factor of the foldable mobile devices and then relying solely on electronic and optics to perform subject tracking in video applications, the disclosed systems, apparatuses, and methods enable the foldable mobile device to autonomously adjust a geometric form factor selected by the user. This autonomous form factor control is useful to greatly facilitate certain aspects of subject tracking in video applications. Additionally, although subject tracking relies to a large extent upon the subject staying within the field of view, there are a wide variety of reasons that it may be desirable to automatically maintain a subject within a field of view of one or more cameras capturing video.

The detailed description of the drawings that follows, describes the systems, apparatuses, and methods for autonomous form factor control of a foldable mobile device developed by the inventors of the present disclosure for subject tracking and for maintaining a subject within a video capture field-of-view for various useful purposes.

FIG. 1 is a schematic block diagram illustrating a system 100 for autonomous form factor control of a foldable mobile device 101, according to one or more examples of the present disclosure.

In various examples, the system 100 includes one or more foldable mobile devices 101a, 101b, one or more portable computing devices 103 (e.g., laptops, tablets, hybrids, and the like, with integrated displays), one or more desktop computing devices 106, (e.g., with desktop displays 108), one or more large format displays 114, one or more data networks 110, and one or more network services 112.

The system 100 and various components of the system 100 may be used by one or more users 103a, 103b and certain components of the system 100 may be used by one or more remote users 122 using one or more remote communication devices 124.

In various examples, at least one of the foldable mobile devices 101, such as foldable mobile device 101a, is configured to interact with a user 103a to facilitate capturing and exchanging video data (e.g., in a video conference) with another foldable mobile device 105b utilized by another user 103b.

In certain examples, the system 100 includes a data network 110 and the foldable mobile devices 201 are communicatively coupled to one or more other foldable mobile devices 201 and/or to one or more network services 112 over the data network 110, described below. The foldable mobile devices 201, in a further example, may include processors, processor cores, specialized processors such as AI accelerators, GPUs, and so forth that execute various programs, program code, applications, instructions, functions, and/or the like. In some examples, the foldable mobile devices 201 use the data network 110 to download application-specific software such as video capture software, video device adjusting software, drivers, and other software that may benefit from or assist with intelligent video source selection.

The data network 110, in one example, includes a digital communication network that transmits digital communications. The data network 110 may include a wireless network, such as a wireless cellular network, a local wireless network, such as a Wi-Fi network, an ad hoc network, and/or the like. The data network 110 may include a wide area network ("WAN"), a local area network ("LAN"), an optical fiber network, the internet, or other digital communications network. The data network 110 may include two or more networks. The data network 110 may include one or more servers, routers, switches, and/or other networking equipment. The data network 110 may also include one or more computer readable storage media, such as a hard disk drive, an optical drive, non-volatile memory, RAM, or the like.

The wireless connection may be a mobile telephone network. The wireless connection may also employ a Wi-Fi network, including for example, Wi-Fi networks similar to any one of the Institute of Electrical and Electronics Engineers ("IEEE") 802.11 standards. All standards and/or connection types include the latest version and revision of the standard and/or connection type as of the filing date of this application.

The one or more network services 112, in one example, may be embodied as blade servers, mainframe servers, tower servers, rack servers, and/or the like. The one or more network services 112 may be configured as mail servers, web servers, application servers, FTP servers, media servers, data servers, web servers, file servers, virtual servers, and/or the like. The one or more network services 112 may be communicatively coupled (e.g., networked) over a data network 110 to one or more foldable mobile devices 201. The network services 112 may comprise back-end servers for video processing, cognitive services, video integration, and/or the like.

Figure 2:
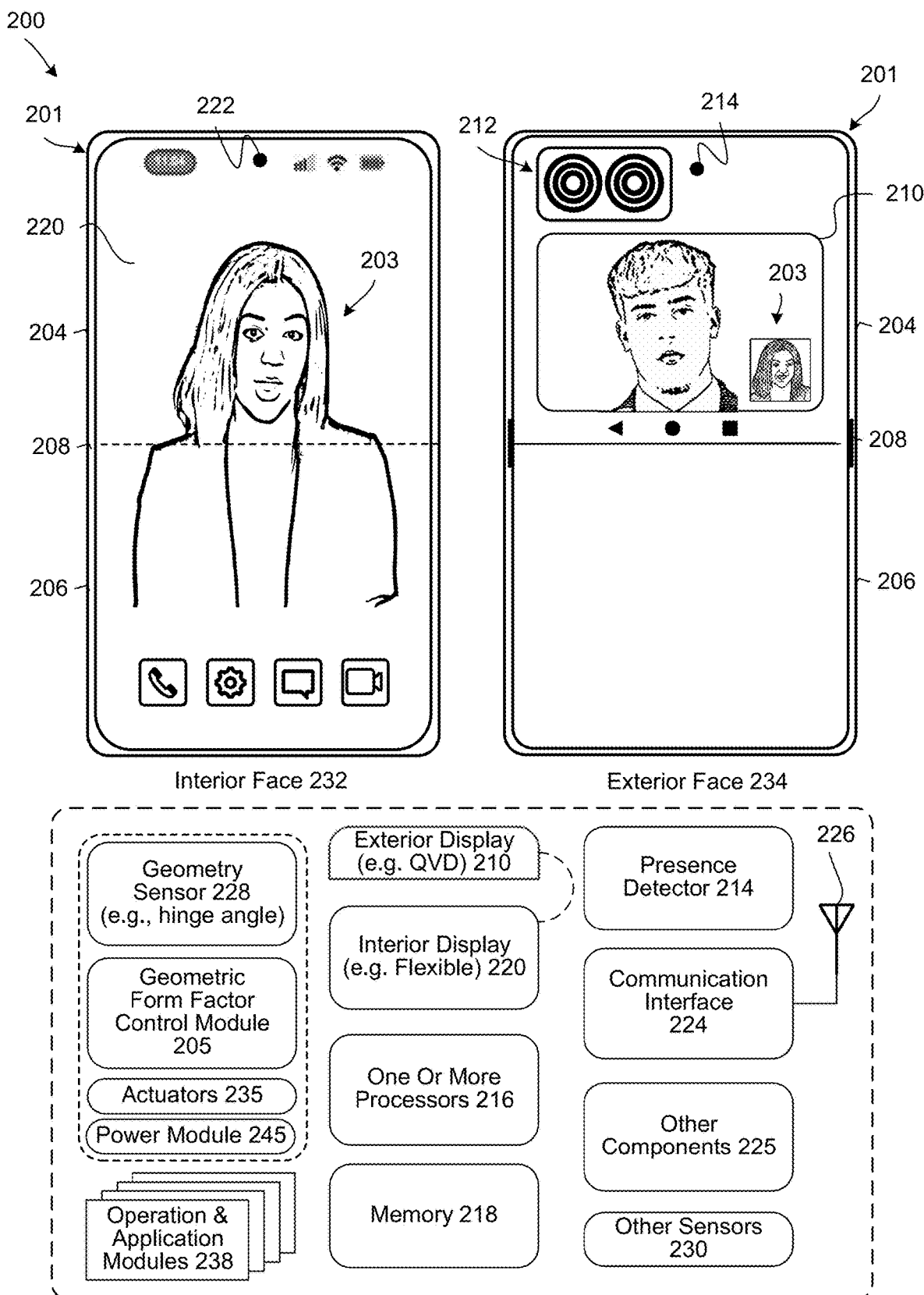
FIG. 2 is a schematic block diagram of an apparatus including a foldable mobile device with an autonomous form factor control module and various other components, according to one or more examples of the present disclosure.

Referring to FIG. 1 and also to FIG. 2, in certain implementations, the system 100 includes a foldable mobile device 101 with a communication interface that connects to a large format display 114. The system 100 further includes, in some implementations, a flexible display 220 that stretches across a first device housing 204 and a second device housing 206.

The system 100 includes, in various implementations, a quick view display 210 on an exterior face 234 of a first device housing 204 with one or more hi-res cameras 212 that enable a hi res image of a subject 103a, 103b in front of the hi-res cameras 212 to be concurrently displayed on the quick view display 210 and communicated to the large format display 114. Unless otherwise clear from context, the term "large format display" (LFD) refers to a display monitor or "big screen TV" such as an LCD flat-screen above 32 inches, including those used in businesses for video conferencing, for home theatre applications, and in various corporate, and public environments.

In general, for large format display the user or closest viewer should not sit closer than the width of the display screen itself. This means that a foldable mobile device such as 101a, 101b that autonomously controls its own form factor for different viewing and video capturing scenarios in which users 103a and 103b are both viewing and capturing video of themselves at different distances and in environments in which they have different degrees of freedom to move forward or backward must account for various complexities in the system.

For example, the geometric form factor control module 105 must account for various complexities related to video capture differences in typical zoom, focus, and resolution and so forth between exterior cameras (e.g. main camera) and interior cameras (e.g., selfie cameras) as well as differences between foldable mobile device interior displays (typically larger full screen flexible, sometimes higher resolution) and exterior displays (typically half screen or smaller) and selectable form factors available for a user to capture video of herself or himself while viewing the relevant foldable mobile device display for the selected form factor and simultaneously viewing an external display receive a video feed from the foldable mobile device. More about the problem to be solved created by these complexities is described below with respect to FIG. 3. Further details about how the apparatuses, methods, and system of the present disclosure as depicted in various example implementations address these complexities and provide beneficial solutions is described in more detail with respect to FIGS. 4-10.

The system 100 further includes one or more shape memory alloy (SMA) actuators 235 that linearly expand or contract to cause an angular rotation that autonomously controls a hinge angle between the first device housing 204 and the second device housing 206.

In one or more implementations, the system 100 includes a processor 216 with a memory 218 comprising executable code that causes that processor 216 to perform determining a selected form factor of the foldable mobile device. The processor, in various example, further performs, sensing a forward motion or a backward motion of the subject within a field of view of the one or more hi-res cameras 212.

In some implementations of the system 100, in response to the forward motion of the subject, the code causes the processor 216 to perform raising a pointing elevation angle of the one or more hi-res cameras facing the subject to facilitate maintaining the subject within the field of view by causing the processor to generate signals that cause the SMA actuators to autonomously control the hinge angle in first a direction that raises the pointing elevation angle based on the selected geometric form factor. In the context of this disclosure, the term "hi res" refers to a camera that has least 50 megapixel resolution and capable of capturing at least 4K HD video at 30 frames per second.

In the system 100 in certain implementations, in response to the forward motion of the subject, the code causes the processor 216 to perform lowering a pointing elevation angle of the one or more hi-res cameras facing the subject to facilitate maintaining the subject within the field of view by causing the processor to generate signals that cause the SMA actuators to autonomously control the hinge angle in a second direction that lowers the pointing elevation angle based on the current form factor.

A more detailed explanation of why and how the autonomous form factor control of the foldable mobile device is performed is provided in the description that follows.

FIG. 2 is a schematic block diagram of an apparatus 200 including a foldable mobile device 201 with a geometric form factor control module 205 and various other components, according to one or more examples of the present disclosure.

In various implementations, the foldable mobile device 201 includes a first device housing 204 that is selectively pivotable about a hinge 208 to a hinge angle relative to a second device housing 206 for foldably positioning the foldable mobile device into selected geometric form factors for capturing video of a user.

For example, a fully closed form factor for storing or charging the phone or turning it off or putting it in one's pocket. A partially or fully open form factor is convenient for talking or viewing a movie taking a photo. To use the foldable mobile device 201 as its own tripod for capturing video to use in a video call or to display on an external screen, several form factors are quite convenient. A tent form factor which has an inverted V shape such as exemplified by the foldable mobile device 101b depicted in FIG. 1.

Another convenient tripod like form factor for capturing video is a stand form factor. A stand form factor may be an exterior facing stand form factor where an exterior camera 212 faces the user or subject such as is exemplified by the foldable mobile device 101a depicted in FIG. 1. A stand form factor may also be an interior facing stand form factor where interior camera 222 (also sometimes referred to as a selfie camera) faces the user or subject.

In various implementations, the foldable mobile device 201 includes an interior display 220 which in certain implementations may be a flexible display that stretches across an interior face of first device housing 204 and the second device housing 206.

For illustrative purposes, the foldable mobile device 201 is shown as a smartphone. Other foldable mobile devices 201 with relevant video capture features and functions including tablet computers, gaming devices, multimedia players, and so forth, are also benefitted.

The foldable mobile device 201 includes a first device housing 204 and a second device housing 206 (which for convenience may be referred to as a housing 236 without implying the sameness or distinctness of first device housing 204 and a second device housing 206 unless otherwise clear from context). In one or more implementations, a hinge 208 couples the first device housing 204 to the second device housing 206. In one or more implementations, the first device housing 204 is selectively pivotable about the hinge 208 relative to the second device housing 206. For example, in one or more implementations the first device housing 204 is selectively pivotable about the hinge 208 between a closed position, a partially open position, and an open position.

In one or more implementations, the first device housing 204 and the second device housing 206 are manufactured from a rigid material such as a rigid thermoplastic, metal, or composite material, although other materials can be used. For example, the housing 236 may be formed of or include a malleable, bendable, or physically deformable material such as a flexible thermoplastic, flexible composite material, flexible fiber material, flexible metal, organic or inorganic textile or polymer material, or other materials. The housing 236 could be formed from a single flexible housing member or from multiple flexible housing members.

In other implementations, the housing 236 includes a composite of multiple components. For instance, in another implementation the housing 236 includes a combination of rigid segments connected by hinges or flexible materials. Still other constructs are available to those of ordinary skill in the art having the benefit of this disclosure.

The illustrative foldable mobile device 201 of FIG. 2 includes multiple displays. As used in FIG. 2 and in the description thereof, the terms "interior" and "interior facing" describe displays, cameras, or other portions of the foldable mobile device 201 which when folded to a closed position are on the interior meaning that they are not exposed and the terms "exterior" and "exterior facing" describe displays, cameras, or other portions of the foldable mobile device 201 which when folded to a closed position are on the exterior meaning that they are exposed.

In FIG. 2, an interior display 220 is depicted as a larger elongated display that is typically viewed as the main display and the one that a user touches, watches, and puts against his or her face. The interior display 220 is concealed when the first device housing 204 is pivoted about the hinge 208 relative to the second device housing 206 to a closed position. For example, on the right hand side of FIG. 2, the interior display 220 is not shown is concealed and on the lefthand side. This interior display 220 is then opened to view when the first device housing 204 is pivoted about the hinge 208 relative to the second device housing 206 from the closed position to an axially displaced open position. Thus, the interior display 220 is revealed as the foldable mobile device 201 transitions from the closed position of FIG. 2 to the open position of FIG. 4.

In various implementations, the foldable mobile device 201 includes an exterior display 210 which may also be referred to as a quick view display, or front-facing display. The exterior display 210 is consistently exposed to the exterior view or environment. For example, when the first device housing 204 and the second device housing 206 are pivoted about the hinge 208 to the closed position, or when the foldable mobile device 201 is folded into any selected geometric form factor such as a tent mode form factor with an inverted V shape or a stand mode form factor with an L-shape. In one or more implementations, the interior display 220 is a high-resolution display and the exterior display 210 is also a high-resolution display. In the implementation depicted in FIG. 2, the interior display 220 is coupled to both the first device housing 204 and the second device housing 206 and spans the hinge 208.

In one or more implementations, the interior display 220 and/or the exterior display 210 are touch-sensitive. In such implementations, users are able to deliver interface with one or both of the interior display 220 and/or the exterior display 210 by delivering touch input from a finger, stylus, or other objects disposed proximately with the interior display 220 and/or the exterior display 210.

In the illustrative implementation of FIG. 2, since the interior display 220 spans the hinge 208, it is configured to be flexible. For instance, In one or more implementations the interior display 220 is configured as an organic light emitting diode (OLED) display fabricated on a flexible plastic substrate. This allows the interior display 220 to be flexible so as to deform when the first device housing 204 pivots about the hinge 208 relative to the second device housing 206. In certain implementations, other types of displays known to those of ordinary skill in the art could be used to the extent that they are consistent with the claims of the present disclosure.

In one or more implementations, the interior display 220 is configured as an OLED constructed on flexible plastic substrates to allow the interior display 220 to bend in accordance with various bending radii. For example, some implementations allow bending radii of between thirty and six hundred millimeters to provide a bendable display. Other substrates allow bending radii of around five millimeters to provide a display that is foldable through active bending. Other displays can be configured to accommodate both bends and folds. In one or more implementations the interior display 220 may be formed from multiple layers of flexible material such as flexible sheets of polymer or other materials. For example, in certain implementations, two or more different adhesive layers with different thicknesses and different shear properties enable the interior display 220 to be repeatedly flexed without creating optical defects.

In various example in implementations, the foldable mobile device 201 includes devices for capturing video streams such as one or more cameras 211 and corresponding microphones (not shown) where the one or more cameras 211 may be disposed in the first device housing 204 and/or the second device housing 206.

For example, in some implementations, the one or more cameras 211 include an interior camera 222 and/or one or more exterior cameras 212. It may be noted that any of the one or more cameras 211 may refer to any number of types of image capture devices.

In certain implementations, the foldable mobile device 201 includes one or more processors 216. In certain implementation, the one or more processors 216 include an application processor and/or one or more auxiliary processors which may be a microprocessor, a group of processing components, one or more ASICs, programmable logic, or other type of processing device.

The application processor and the auxiliary processor(s), in certain implementations, are operable with the various components of the foldable mobile device 201. The application processor and/or the auxiliary processor(s) process and execute executable software code to perform the various functions of the foldable mobile device 201. In various implementations, one or more storage devices, such as memory 218, store the executable software code used by the one or more processors 216 during operation.

In one or more implementations, the foldable mobile device 201 also includes a presence detector 214, operable to detect whether one or more persons are within an environment of the foldable mobile device 201. In one or more implementations, the presence detector 214 detects actuation of the one or more exterior cameras 212 and/or an interior camera 222.

In some examples, the presence detector 214 includes a facial recognition module that analyzes images captured by the one or more exterior cameras 212 and/or an interior cameras 222 to identify facial characteristics present in images captured by the one or more exterior cameras 212 and/or an interior cameras 222. In one or more implementations, in response to the presence detector 214 identifying these or other image capture operations, the one or more processors determines whether one or more persons are situated within the environment of the foldable mobile device 201, as well as where these one or more processors are located relative to the foldable mobile device 201.

In various implementations, the foldable mobile device 201 includes a communication interface 224 that is selective configured for wired or wireless communication with one or more other devices or networks. The selectable networks include a wide area network, a local area network, and/or personal area network. In certain implementations, the communication interface 224 utilizes wireless technology for communication, such as, peer-to-peer or ad hoc communications, and other forms of wireless communication such as infrared technology. In some examples, the communication interface 224 includes one or more of wireless communication circuitry, a receiver, a transmitter, a transceiver, and/or antennas 215.

In various implementations, the one or more processors 216 are responsible for performing certain primary functions of the foldable mobile device 201. For example, In one or more implementations the one or more processors 216 comprise one or more circuits operable with one or more user interface devices, which can include the interior display 220, to present content offerings including images, video, or other presentation information to a user. In some examples, the executable software code used by the one or more processors 216 are included in one or more operational and/or applications modules 238 that are operable with the one or more processors 216. In various implementations, the operational and/or applications modules 238 store instructions, control algorithms, logic steps, and so forth.

In certain implementations, a processor of the one or more processors 216 executes instructions that cause it to receive information from the presence detector 214 and/or from the one or more cameras 211 which may include the interior camera 222 or the one or more exterior cameras 212 to detect motion of a user or subject.

In some implementations, the instructions cause the processor to perform sensing a forward motion or a backward motion of a subject within a field of view of the one or more cameras 211 in the first device housing 204. In various implementations, such as depicted in FIG. 2, interior cameras such as the interior camera 222 and exterior cameras such as the one or more exterior cameras 212 are all located in the first device housing 204 so which of the one or more cameras 211 senses the user or subject depends on whether the subject is positioned within the field of view of the interior camera 222 or the one or more exterior cameras 212.

In one or more implementations, the one or more processors 216 are responsible for running the operating system environment of the foldable mobile device 201. The operating system environment can include a kernel and one or more drivers, and an application service layer, and an application layer. The operating system environment can be configured as executable code operating on one or more processors or control circuits of the foldable mobile device 201. The application layer can be responsible for executing application service modules. The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In various implementations, the one or more processors 216 generate commands or execute control operations based on information received from various sensors, including the one or more geometry sensors 228, the presence detector 214, or other sensors 230. The one or more processors 216, in some implementations, generate commands or execute control operations based upon information received from a combination of the one or more geometry sensors 228, the presence detector 214, or the other sensors 230. In various implementations, the one or more processors 216 can generate commands or execute control operations based upon information received from the one or more geometry sensors 228 or the presence detector 214 alone. Moreover, the one or more processors 216 process the received information alone or in combination with other data, such as the information stored in the memory 218.

The one or more other sensors 230 may include a microphone, an earpiece speaker, a second loudspeaker, and a user interface component such as a button or touch-sensitive surface. The one or more other sensors 230 may also include key selection sensors, proximity sensors, a touch pad sensor, a touch screen sensor, a capacitive touch sensor, a light sensor, and one or more switches. Touch sensors may be used to indicate whether any of the user actuation targets present on the interior display 220 or the exterior display 210 are being actuated. Alternatively, touch sensors disposed in the foldable mobile device 201 can be used to determine whether the foldable mobile device 201 is being touched at side edges or major faces of the first device housing 204 or the second device housing 206. The touch sensors can include surface and/or housing capacitive sensors In one or more implementations. The other sensors 230, in some implementations, also include audio sensors.

Other components 225 operable with the one or more processors 216 include output components such as video outputs, audio outputs, and/or mechanical outputs. Examples of output components include audio outputs such as speaker port 207, earpiece speaker, or other alarms and/or buzzers and/or a mechanical output component such as vibrating or motion-based mechanisms. Still other components will be recognized as useful for inclusion to those of ordinary skill in the art having the benefit of this disclosure.

The other sensors 230, in certain examples, include motion detectors, such as one or more accelerometers or miniature electronic gyroscopes (e.g., micro-electro-mechanical system (MEMS) gyroscopes or solid state inertial sensors). For example, an accelerometer may be embedded in the electronic circuitry of the foldable mobile device 201 to show vertical orientation, constant tilt and/or whether the foldable mobile device 201 is stationary. In some implementations, the geometric form factor control module 205 may use the accelerometer.

In various implementation, the foldable mobile device 201 includes one or more geometry sensors 228, operable with the one or more processors 216, and/or the to detect a particular geometry, geometric form factor, or deformation state of the foldable mobile device 201. For example, in one or more implementations the one or more geometry sensors 228 can detect a bending operation that causes the first device housing 204 to pivot about the hinge 208 relative to the second device housing 206, thereby transforming the foldable mobile device 201 into a selected geometric form factor such as the tent mode form factor depicted.

In one or more implementations, the geometry sensors 228 comprise passive resistive devices manufactured from a material with an impedance that changes when the material is bent, deformed, or flexed. An individual geometry sensor 228, in some implementations, comprises a bi-directional flex sensor that detects flexing or bending in two directions. In various example implementations, the one or more geometry sensors 228 have an impedance that increases in an amount that is proportional with the amount it is deformed or bent. Other types of geometry sensors 228 which are known to those of ordinary skill in the art may be incorporated into the foldable mobile device 201 who have the benefit of this disclosure.

In various implementations, the one or more processors 216, read or calculate values from one or more geometry sensors 228. For example, in certain implementation a processor 216 determines a hinge angle between the first device housing 204 and the second device housing 206 by detecting changes in the impedance as a function of resistance, using the one or more geometry sensors 228 to detect bending of the first device housing 204 about the hinge 208 relative to the second device housing 206 and comparing the changes in resistance to a reference resistance.

In certain implementations, the one or more processors 216, also use data or information from one or more instances of the geometry sensors, from the one or more cameras 211 such as the interior camera 222 or the one or more exterior camera 212, and/or from one or more other sensors 230 such as accelerometers, miniature electronic gyroscopes or other sensors suitable to determine a current orientation of the foldable mobile device 201 to determine a current geometric form factor of the foldable mobile device 201.

For example, certain geometric form factors for the foldable mobile device 201 are beneficially convenient and stable for image capture. Tent mode form factor is an example of a convenient and stable geometric form factor for the foldable mobile device 201 to enable the first device housing 204 and second device housing 206 of the foldable mobile device 201 to act together as an adjustable camera bipod for the foldable mobile device 201. An example of a foldable mobile device 101b positioned in a tent mode form factor with an inverted V-shape is shown in FIG. 1 where a user is using the foldable mobile device 101b in a tent mode to capture video stream of himself instead of using a webcam while viewing the video stream on a large format display 114 from a reasonable distance.

Stand mode form factors are another notable category of geometric form factors that enable the first device housing 204 and second device housing 206 of the foldable mobile device 201 to act together as an adjustable camera stand. For example, the foldable mobile device 101a shown in in FIG. 1, illustrates an example of an exterior facing stand mode form factor with an exterior facing L-shape for facilitating handsfree video capture of a user near a laptop using her foldable mobile device 101a for video conferencing and display on her laptop, rather than using the webcam of the laptop.

Figure 3:
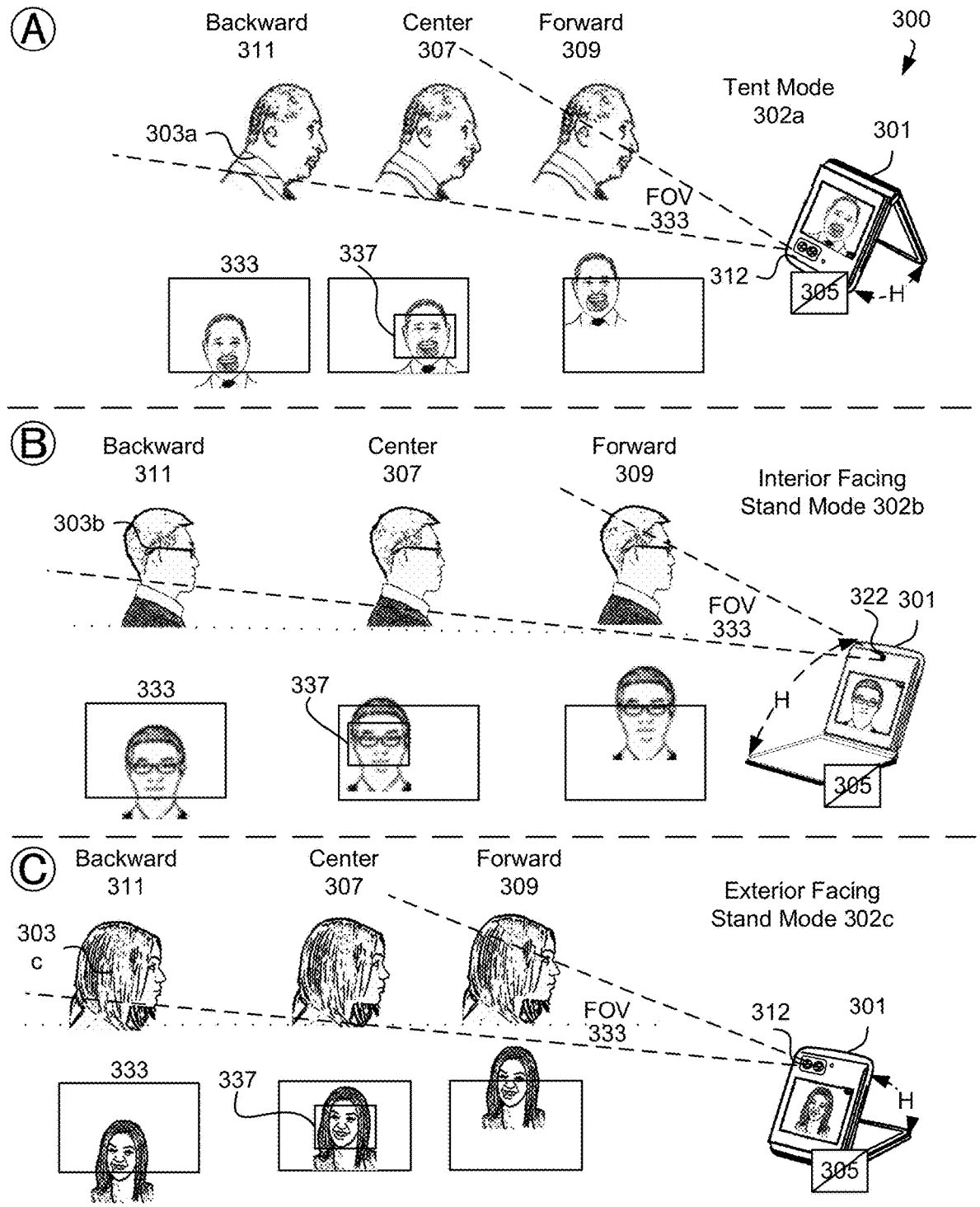
FIG. 3 is an illustration of an apparatus including a foldable mobile device with a disabled autonomous form factor control module and a user at positions within and outside of a camera field of view with the foldable mobile device positioned in selected geometric form factors, according to one or more examples of the present disclosure.
Figure 6:
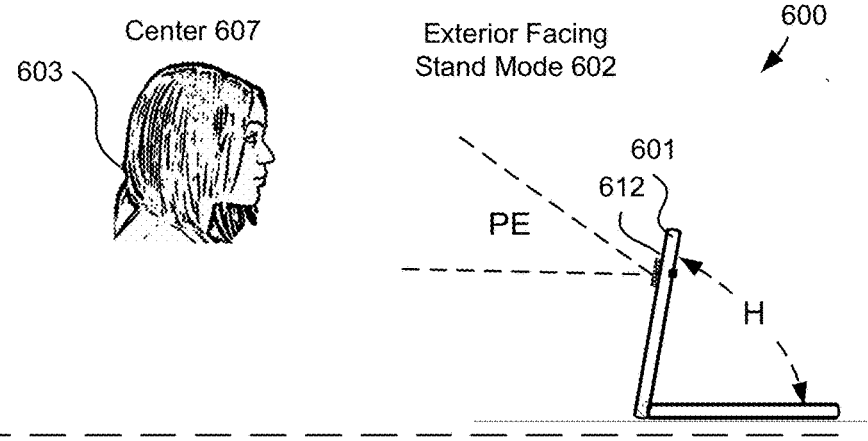
FIG. 6 is a side view illustration of an apparatus including a foldable mobile device configured in an exterior facing stand mode form factor and performing autonomous form factor control to maintain a forward or backward moving user within a camera field of view, according to one or more examples of the present disclosure.
Figure 6:
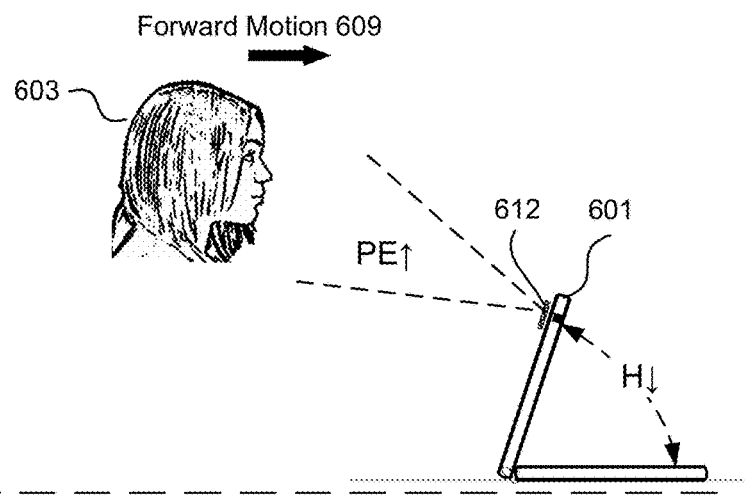
Figure 6:
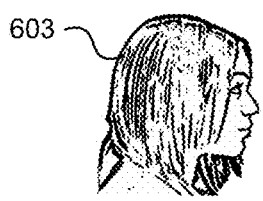
Figure 7:
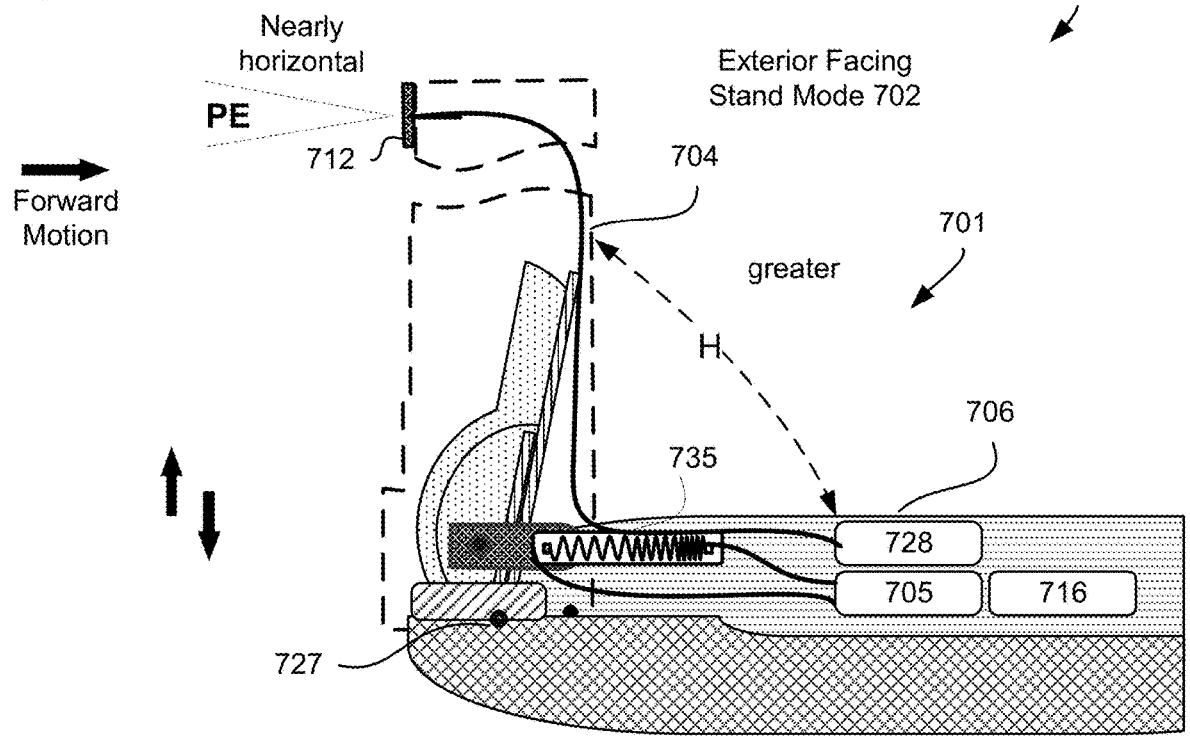
FIG. 7 is a side view illustration of an apparatus including a foldable mobile device that performs autonomous form factor control with linear SMA actuators according to one or more examples of the present disclosure.
Figure 7:
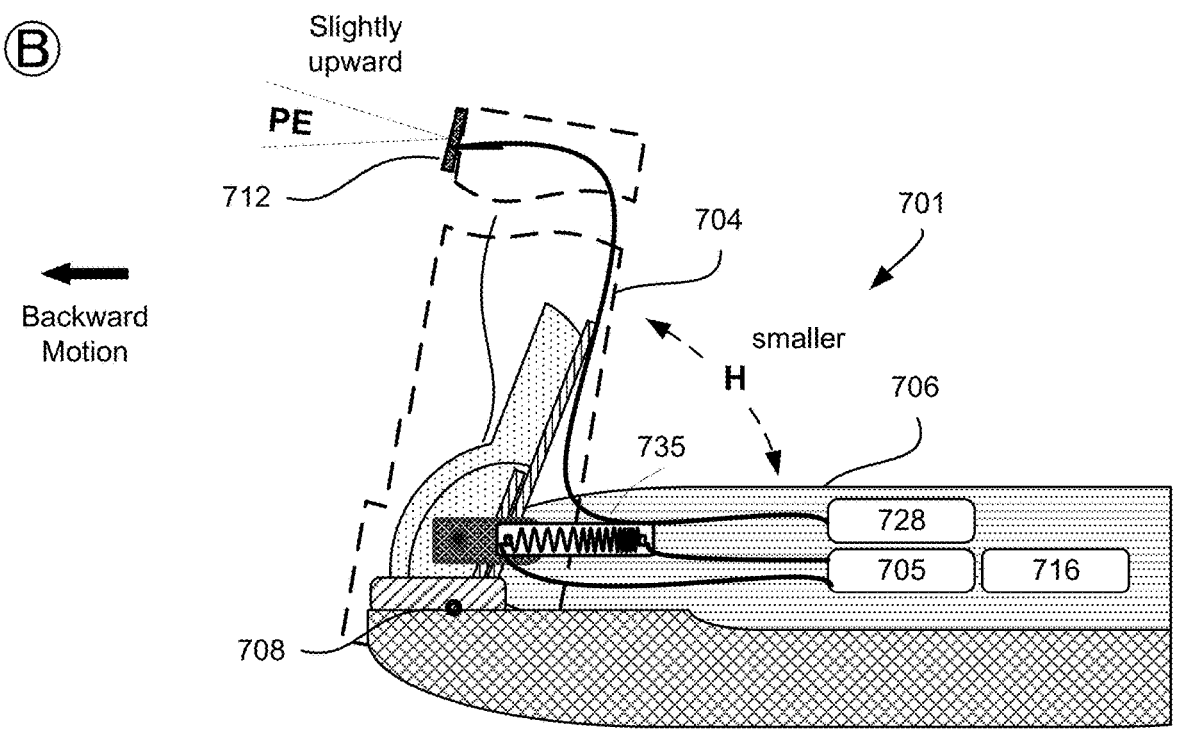
Figure 8A:
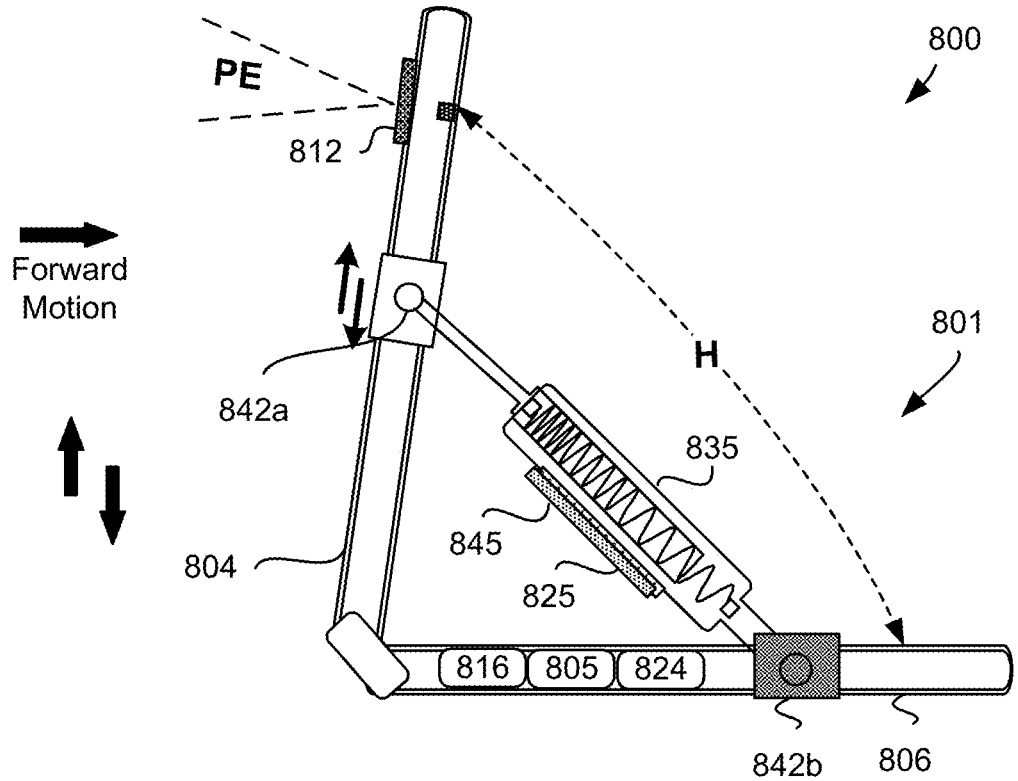
FIG. 8A is a side view illustration of an apparatus including a foldable mobile device that performs autonomous form factor control with external linear SMA actuators according to one or more examples of the present disclosure.
Figure 8A:
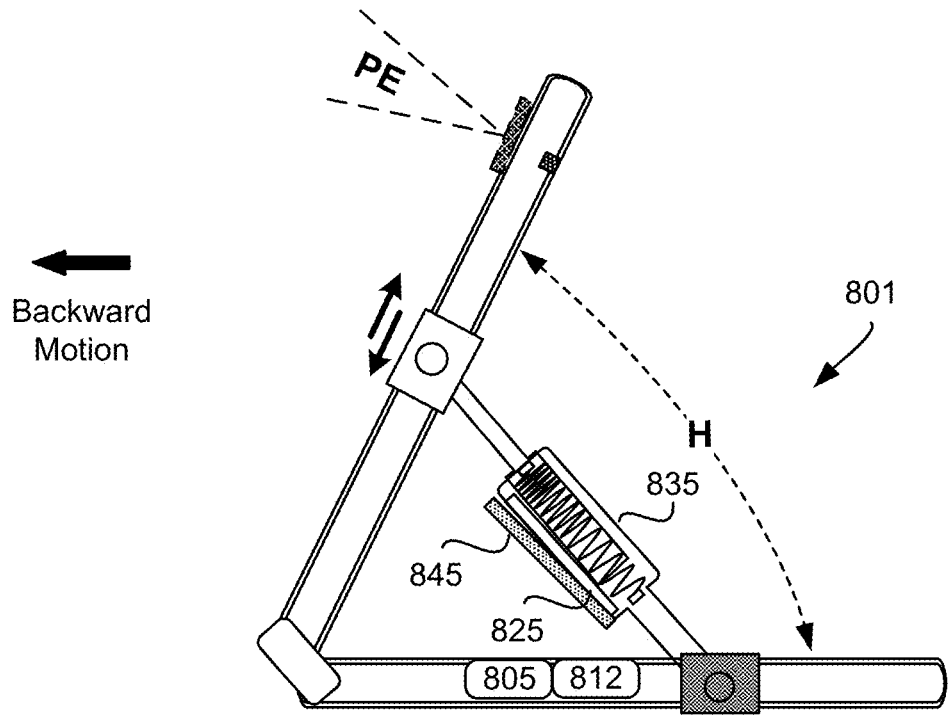
Figure 8B:
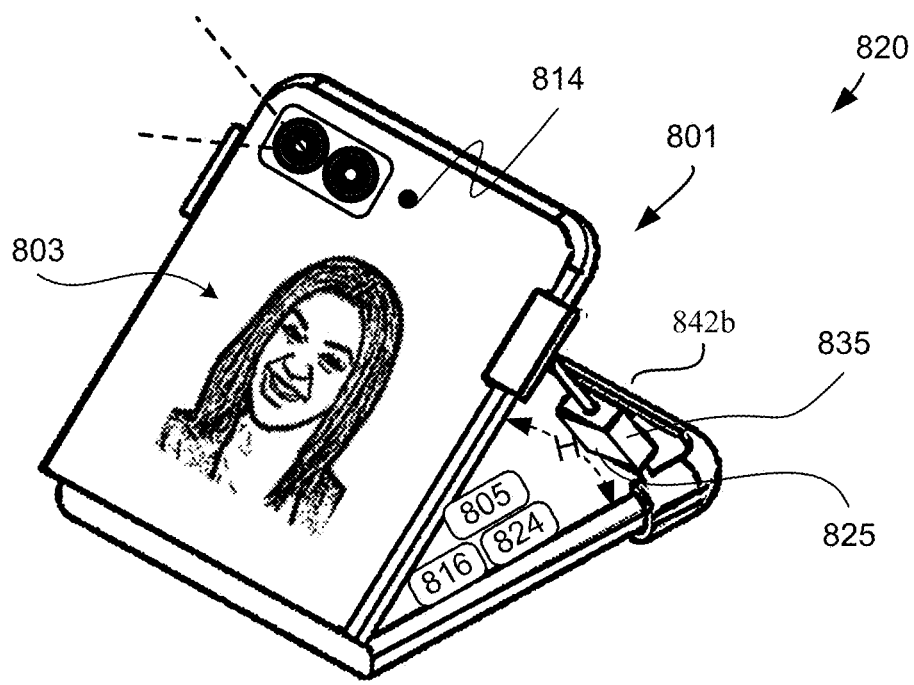
FIG. 8B is a side view illustration of a variation of the apparatus of FIG. 8A.
Figure 9:
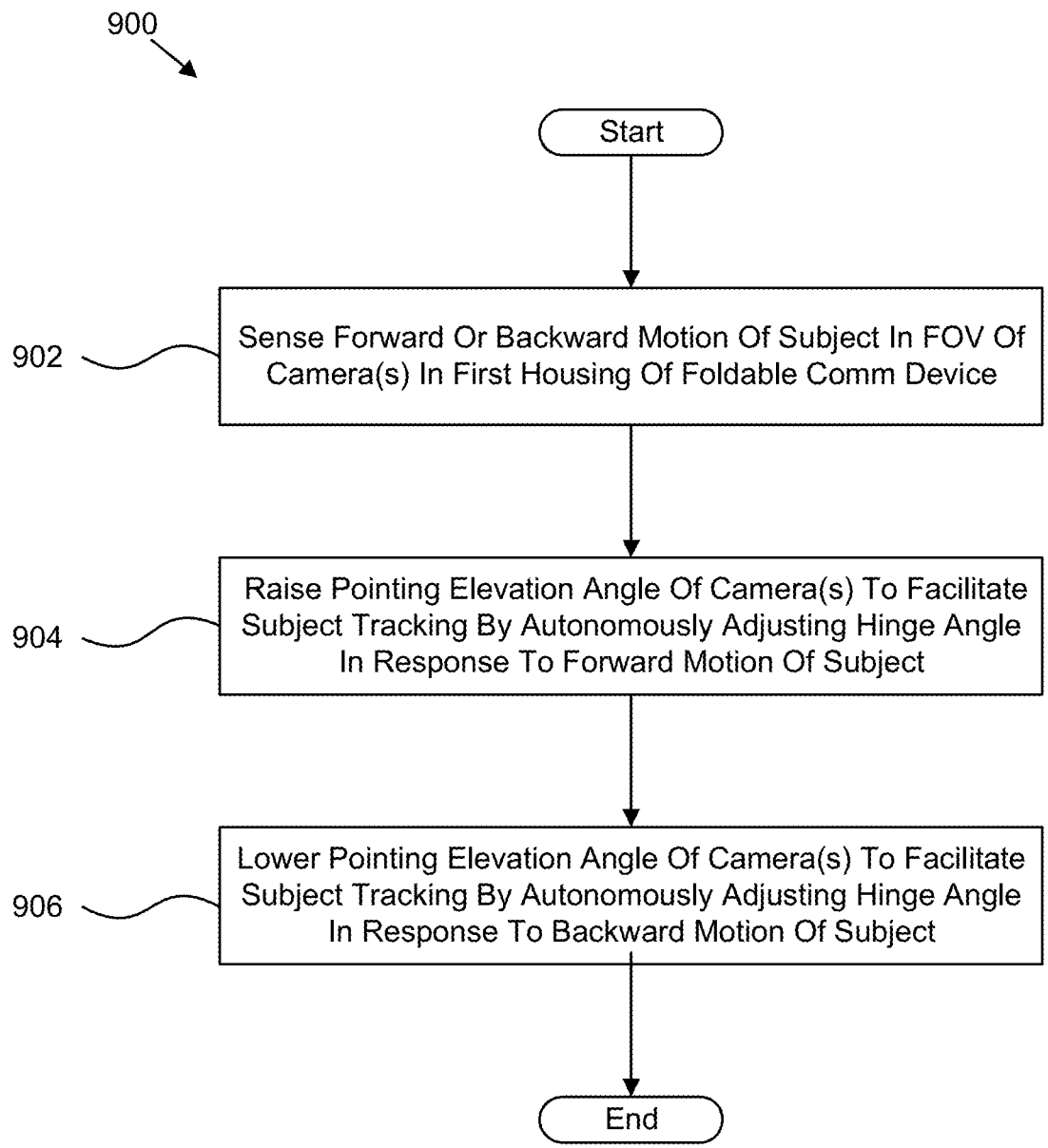
FIG. 9 is a schematic flow chart diagram illustrating a method for autonomous form factor control of a foldable mobile device according to one or more examples of the present disclosure.

Further examples of foldable mobile devices in exterior facing stand mode are provide in this disclosure, including foldable mobile device 301a shown in FIG. 3, foldable mobile device 601 shown in FIG. 6, foldable mobile device 701 shown in FIG. 7, foldable mobile device 801 shown in FIG. 8A and FIG. 8B, and foldable mobile device 901 shown in FIG. 9.

Another stand mode form factor is an interior facing stand mode where in the stand mode, the interior camera 222 or selfie camera is facing the user. Further examples of foldable mobile devices in interior facing interior stand mode are foldable mobile device 301b shown in FIG. 3, foldable mobile device 501 shown in FIG. 5.

It may be noted that throughout this disclosure, unless otherwise clear from context, where one or more components or structures of a particular type are disclosed such as one or more cameras 211, one or more processors 216, one or more actuators 235, and so forth, in order to simplify explanatory examples reference to such components or structures may be made in singular form in order to simplify the grammatical structure of the examples without implying any upper or lower limit as to the number of components used in any combination.

Notably, of three selected geometric form factors that are particularly convenient for stably positioning foldable mobile device to act as its own camera bipod or camera stand, the tent mode in the only one in which the hinge 208 is oriented higher than any of the one or more cameras 211. Accordingly, in various examples, where the foldable mobile device 201 is folded to some hinge angle H between the first device housing 204 and the second device housing 206 that is greater than 0° and less than 180°, and the foldable mobile device 201 configured to capture images, e.g., video of a user or subject who is viewing himself or herself in a display in the first device housing 204 (e.g., either the upper part of the interior display 220 or the exterior display 210) the processor 216 executes instructions which determine that the selected geometric form factor of the foldable mobile device 201 is in a tent mode with an inverted V-shape based on sensor information from other sensors 230 such as an accelerometer, an electronic gyroscope, or similar MEMS type device orientation sensor indicating that the one or more cameras 211 are oriented lower than the hinge 208.

Although information from the presence detector 214 and or the external cameras 212 about whether the subject is in the field of view of one or more cameras 211 on the exterior face 234 of the foldable mobile device 201 is available, in the tent mode, the subject should not be within the field of view of the interior camera 222 on the interior face 232 of the foldable mobile device 201 because the interior camera 222 is on the inside of the "tent."

In some examples, the processor 216 executes instructions to determine that the foldable mobile device 201 is in an interior facing stand mode with an L-shape based on sensor information indicating that one or more cameras 211 are oriented higher than the hinge 208 and that the subject is in the field of view of a camera of the one or more cameras 211 on the interior face 232 of the first device housing 204.

As highlighted by the title "autonomous form factor control of a foldable mobile device" and as described above in the introduction and the description of system 100 depicted in FIG. 1, the ability of the foldable mobile device 201 to autonomously control its current form factor in response to the direction of forward or backward motion of the subject relative to subject relative to the foldable mobile device 201 and the one or more cameras 211 capturing images e.g., video of the subject is a significant improvement in mobile device technology.

In the context of this disclosure, the words "autonomous" and "autonomous control" are used to connote simple form of self-movement of a foldable mobile device such as the foldable mobile device 201 based on "awareness" of a current state (e.g., data corresponding to selected current form factor) and initiated in response to environmental parameters (e.g., forward or backward motion of a subject) sensed by the foldable mobile device's eyes (e.g., the one or more cameras 211). Moreover, in the context of this disclosure, autonomous control of the mobile device would not be understood as including self-movements of the foldable mobile device based on its awareness of a current state and initiated in response to sensing of a manual input such as touching, tapping, swiping, gesturing, holding, carrying, or dropping of the foldable mobile device.

As noted above, in various implementations, one or more portions of the geometric form factor control module 205, like other modules, are implemented in code and/or software for execution by the one or more processors 216. In some implementations, certain portions of the geometric form factor control module 205 may be implemented as a hardware circuit using logic circuits transistors or other discrete components.

In certain implementations, the geometric form factor control module 205 is implemented as combination of instructions, supporting circuitry, and actuators 235 internal to the foldable mobile device 201 that control the geometric form factor of the foldable mobile device 201 when the instructions are executed by the one or more processors 216.

In some implementations, the geometric form factor control module 205 is implemented as instructions executed by the one or more processors 216 which when executed by the processor causes electrical signals to be sent to actuators 235 (that are external to the foldable mobile device 201) to control the form factor of the foldable mobile device 201) as indicated in the instructions.

In one or more implementations, the geometric form factor control module 205 includes instructions executable by the processor 216 to cause the geometric form factor control module 205 to sense a forward motion or a backward motion of a subject 203 within a field of view of the one or more cameras 211 in the first device housing 204 (which as depicted in FIG. 2 could be either the exterior cameras 212 or the interior camera 222).

In various implementations, in response to sensing the forward motion of the subject 203, the geometric form factor control module 205 includes instructions that when executed by the processor 216 perform raising a pointing elevation angle of the one or more cameras 211 to facilitate maintaining the subject 203 within the field of view by autonomously controlling the hinge angle between the first device housing and the second device housing.

As will be illustrated and described in further detail below with respect to FIGS. 4, 5, and 6, the geometric form factor control module 205 also includes instructions that take into account whether raising the pointing elevation angle of the one or more cameras 211 to facilitate maintaining the subject 203 within the field of view is to be performed by increasing or decreasing the hinge angle between the first device housing 204 and the second device housing 206.

A significant challenge in mobile device technology is that mobile devices in general and foldable mobile devices in particular are highly miniaturized and are also expected to be rugged and robust under a wide variety of daily usage conditions including carrying, folding and unfolding, and pushing into and retrieving from pockets, and so forth, therefore mechanical mechanisms or actuators 235 must be sufficiently small to fit within the housings of the foldable mobile device 201 or within a small actuator that attaches to the foldable mobile device 201 what able to exert sufficient force to change the hinge angle H by causing the first device housing 204 to move relative to the second device housing 206.

In such implementations, in response to the backward motion of the subject 203, the geometric form factor control module 205 includes instructions that when executed by the processor 216 perform lowering the pointing elevation angle of the one or more cameras to facilitate maintaining the subject within the field of view by autonomously controlling the hinge angle between the first device housing 204 and the second device housing 206.

In various implementations, the foldable mobile device 201 includes one or more actuators 235 that in response to signals received from instructions from the geometric form factor control module 205 that are executed by the processor 216 cause an angular rotation of the first device housing 204 relative to the second device housing 206 that controls the hinge angle between the first device housing 204 relative and the second device housing 206. As is explained in more detail below with respect to FIGS. 7, 8A, 8B, in certain implementations, the actuators 235 include multiple elements where a first element is controlled by a first signal and a second element is controlled by a second signal.

Because the pointing elevation angle of the interior camera 222 and the exterior cameras 212 are both substantially perpendicular to the plane of the displays in which both types of cameras 211 are located, the instructions for calculating an actuation to increase or decrease the hinge angle H by an amount that will raise or lower the pointing elevation of the corresponding camera to facilitate maintaining the subject with the field of view are derivable using simple trigonometry but will also depend on whether the foldable mobile device 201 senses the forward or backward motion of the subject in the interior camera 222 or in the one or more exterior cameras 212 and if the foldable mobile device 201 senses the forward or backward motion of the subject in the one or more exterior cameras 212, then the instructions will also depend upon whether the foldable mobile device 201 is currently in a tent mode form factor or an exterior facing stand mode form factor. This aspect of the disclosed technology is illustrated and described in more detail below with respect to FIGS. 3, 4, 5, and 6.

In some implementations, the actuators 235 include one or more shape memory alloy (SMA) actuators 238. Certain SMA actuators have significant benefits in terms of size, strength and actuation response for use in foldable mobile devices because they are lightweight, have high tensile strength, fast response and recover time, and are increasingly affordable. In some examples, the SMA actuators 238 include one or more SMA springs that contract in response to an electrical signal and expand in response to an absence of the electrical signal, or alternatively, one or more SMA springs that expand in response to an electrical signal and contract in response to an absence of the electrical signal.

The geometric form factor control module 205 causes electrical signals to be sent to the one or more SMA actuators 238 that linearly expand or contract to cause the angular rotation that changes the hinge angle H between the first device housing 204 and the second device housing 206 as indicated in the instruction.

One source of shape memory alloys and memory alloy actuators that may be suitable for application in geometric form factor control modules for foldable mobile devices such as those disclosed herein are available from Memry Corporation, 3 Berkshire Blvd, Bethel, CT 06801. Another example source, Nexmetal Corp., 8780 19TH ST Alta Loma, CA 91701 miniature two-way shape memory alloy coil springs similar to those depicted in SMA actuator 835 that are designed to exert force by expanding or contracting in response to electrical signals.

FIG. 2 is provided for illustrative purposes only and for illustrating components of a foldable mobile device 201 in accordance with one or more example implementations of the disclosure, and is not intended to be a complete schematic diagram of the various components required for a foldable mobile device 201. Therefore, other foldable mobile devices 201 in accordance with example implementations of the disclosure may include various other components not shown in FIG. 2, or may include a combination of two or more components or a division of a particular component into two or more separate components, and still be within the scope of the present disclosure.

FIG. 3 is an illustration of an apparatus 300 including a foldable mobile device with a disabled autonomous form factor control module 305 and a user at positions within and outside of a camera field of view with the device positioned in selected geometric form factors, according to one or more examples of the present disclosure.

In FIG. 3, the foldable mobile device 301 is depicted in selected geometric form factors. Panel ⒶⒶ of FIG. 3 depicts the foldable mobile device 301 in a tent mode 302*a*. Panel Ⓐ Ⓑ of FIG. 3 depicts the foldable mobile device 301 in an interior facing stand mode 302*b*. Panel Ⓒ of FIG. 3 depicts the foldable mobile device 301 in an exterior facing stand mode 302*c*.

Throughout FIG. 3, the autonomous form factor control module 305 has a diagonal line to depicted it as disabled so that certain problems with maintaining a subject within a video capture field of view as the subject move forward or backward relative to the foldable mobile device 301 may be more readily envisioned.

With the autonomous form factor control module 305 disabled, the foldable mobile device 301 cannot autonomously control its own form factor in response to forward or backward motions of a user. It cannot autonomously control its hinge angle 'H' between its first device housing and its second device housing in order to keep the user within a video capture field view of either the exterior cameras 312 or the interior camera 322 and therefore is likely to experience the same type of problems that existing systems with stationary housings and cameras experience.

As mentioned above, with the autonomous form factor control module 305 disabled, FIG. 3 is intended to illustrate some of the problems that may occur in foldable mobile devices that do not include autonomous form factor control. In each of the panels Ⓐ, Ⓑ, and Ⓒ the selected geometric form factor of the foldable mobile device 301 may have different hinge angle H between the first device housing and the second device housing.

Adding to the complexity of the problem is the fact that in the tent mode form factor 302a and the exterior facing stand mode 302c the field of view 333 at issue for the users 303a, 303c is the field of view of the one or more exterior camera 312 whereas for the interior facing stand mode depicted in panel Ⓑ the field of view 333 at issue for the users for the user 303b is the field of view of the interior camera 322.

One additional complexity in existing foldable mobile devices that is overcome by the disclosed apparatuses, methods and methods is the fact that although in both the tent mode form factor 302a and the exterior facing stand mode 302c the one or more exterior cameras 312 are the cameras facing the users 303a, 303c, in the tent mode form factor 302a the exterior camera(s) 312 are lower than the hinge 308 and in the exterior facing stand mode 302c the exterior camera(s) 312 are higher than the hinge 308. This set of complexities represents a significant challenge that is not easily solved by a primarily software or optical fix as may have been done with some prior field of view issues.

With the autonomous form factor control module 305 disabled (or with existing foldable mobile devices), the hinge angle H must be changed manually which during video capture of user by the user may result in the problems such as described in the following paragraphs.

With the autonomous form factor control module 305 disabled, the hinge angle H is different for each form factor but remains constant which means that when the users 303a, 303b, 303c are at the center position 307, which is depicted as being within the image capture field of view 333, then such subject tracking functions as exist within the optical and/or software image processing capabilities of the foldable mobile device 301 may operate normally without the user needing to reposition himself or to manually change the form factor e.g., change the hinge angle.

With the autonomous form factor control module 305 disabled (or in existing foldable mobile devices) when there is motion forward 309 or backward 311 of the users 303a, 303b, 303c, at least a portion of the user (and the users' image) may go outside of the field of view 333 which may cause certain optical and/or software image processing-based subject tracking functions of the foldable mobile device 301 to fail partially or completely depending on how much of the user has gone outside of the video capture field of 333.

In the context of this disclosure, the terms "forward" and "forward motion" may also refer to any motion that causes an upper portion of the user/image to go outside of a video capture field of view 333 (also referred to herein as an image capture field of view or field of view). For example, when a seated user stands up may be a form of "forward motion" for purposes of this disclosure. Analogously, the terms "backward" and "backward motion" may also refer to any motion that causes a lower portion of an image of a user to go outside of a video capture field of view. For example, when a standing user sits down may be a form of "backward motion" in the context of this disclosure.

For example, some subject tracking software uses facial recognition of a subject's eyes, nose, chin, or other features, which if absent from the field of view cannot be used for subject tracking.

In FIG. 3, a subject tracking box 337 is displayed when the user or subject 303a, 303b, or 303c (or image thereof) is sufficiently within the field of view 333 for subject tracking to work. When the forward 309 motion or backward 311 motion (as defined above) of the subject 303a, 303b, 303c is great enough to begin to cause a portions of the images of the subjects to go outside of the field of view 333, the subject tracking fails and the subject tracking box 337 is not displayed.

As described above and as depicted generally in graphic form in FIG. 3, field of view problems may occur at different points in response to the same degree of forward or backward motion of a user because the field of views for the relevant cameras in each form factor are different even for the same foldable mobile device 301 with the same internal camera 322 and the same exterior camera 312 due to the complexities described above concerning differences in height of the cameras and the hinge angles H for the tent mode 302a, interior facing stand mode 302b, or exterior facing stand mode 302c form factors which.

The autonomous form factor control of a foldable mobile device of the present disclosure allows the foldable mobile device 301 to by itself taking into account these complexities and represents a significant improvement in mobile device technology.

Figure 4:
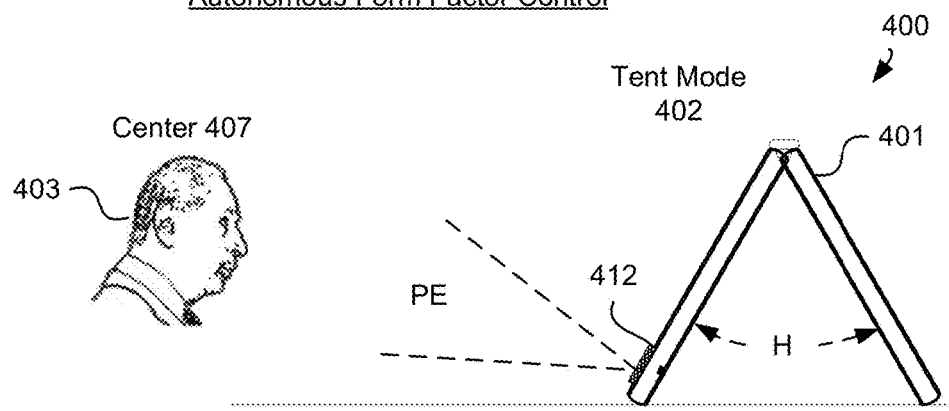
FIG. 4 is a side view illustration of an apparatus including a foldable mobile device configured in a tent mode form factor and performing autonomous form factor control to maintain a forward or backward moving user within a camera field of view, according to one or more examples of the present disclosure.
Figure 4:
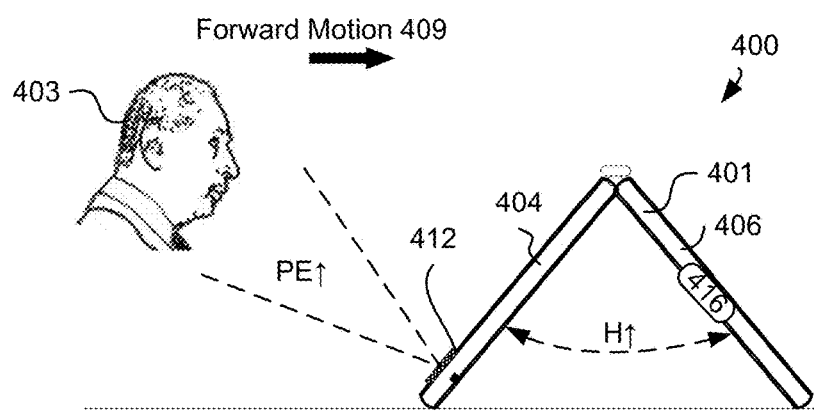
Figure 4:

FIG. 4 is a side view illustration of an apparatus 400 including a foldable mobile device 401 configured in a tent mode form factor 402 and performing autonomous form factor control to maintain a forward or backward moving user 403 within a camera field of view by adjusting a pointing elevation angle PE of one or more exterior cameras 412 in response to a forward motion 409 or a backward motion 411 of the user 403.

Figure 5:
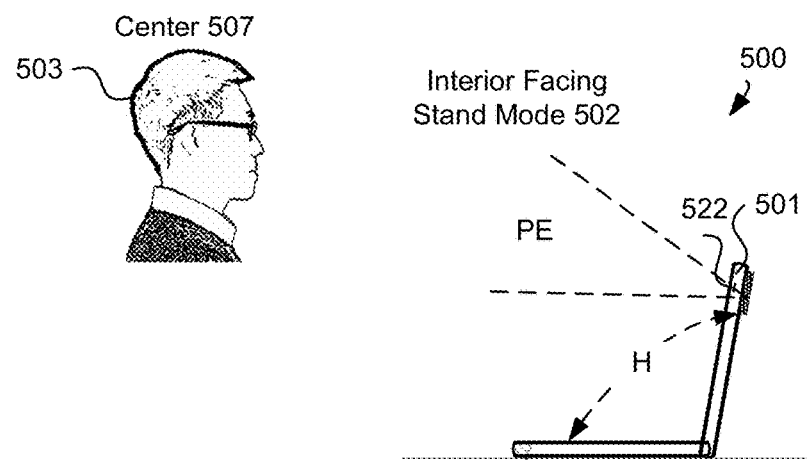
FIG. 5 is a side view illustration of an apparatus including a foldable mobile device configured in an interior facing stand mode form factor and performing autonomous form factor control to maintain a forward or backward moving user within a camera field of view, according to one or more examples of the present disclosure.
Figure 5:
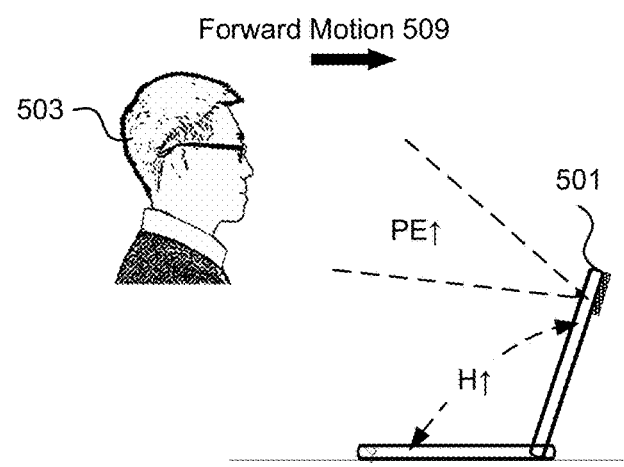
Figure 5:
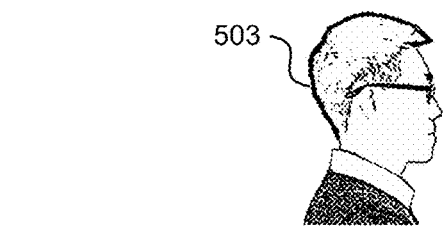

Before describing the example illustrated in FIG. 4 in more detail, it should be noted that with respect to the examples depicted in FIGS. 4, 5, and 6, the foldable mobile devices 401, 501, 601, may be understood to have an "awareness" of their own form factor e.g., gained or determined by the relevant processor executing instructions to determine whether the foldable mobile device is in an exterior or interior facing stand mode or in a tent mode based on sensor information and/or on camera information as described in more detail above with respect to FIG. 2.

Additionally, unless otherwise clear from context, the structures and functions of the respective apparatuses 400, 500, and 600 and the foldable mobile devices 401, 501, 601, depicted in FIGS. 4, 5, and 6, they are numbered to start with respectively with the numerals 4, 5, and but otherwise the reference numbers are intended to correspond substantially with the reference numbers used with respect to FIG. 2 to describe and depicted the apparatus 200 and the foldable mobile device 201 and the structures and functions thereof.

In the example depicted in FIG. 4, instructions executed by the processor 416 of the foldable mobile device 401 (in tent mode form factor 402) causes the processor 416 to perform sensing of a subject within the field of view of the one or more cameras (e.g., exterior cameras 412).

In response to sensing the forward motion 409 of the subject 403, the processor 416 executes instructions to perform raising a pointing elevation angle PE of the one or more cameras 412 to facilitate maintaining the subject 403 within the field of view by autonomously controlling the hinge angle H between the first device housing 404 and the second device housing 406.

As depicted, the letter H for the hinge angle is followed by the up arrow symbol ↑ as in H↑ indicating that, in response to determining that the selected geometric form factor of the foldable mobile device 401 is in the tent mode 402 (as described with respect to FIG. 2), the processor 416 executes instructions that cause the apparatus (e.g., the foldable mobile device 401) to perform raising the pointing elevation angle PE of the one or more cameras 412 to facilitate maintaining the subject within the field of view by autonomously increasing the hinge angle H between the first device housing 404 and the second device housing 406.

In various implementations, in response to the backward motion 411 of the subject, the processor 416 executes instructions that cause the apparatus 400 (including the foldable mobile device 401, geometric form factor control module 205, actuator 235, and so forth as described above with respect to FIG. 2) to perform lowering the pointing elevation angle PE of the one or more cameras 412 to facilitate maintaining the subject 403 within the field of view by autonomously controlling the hinge angle H between the first device housing and the second device housing.

Accordingly, in response to determining that the selected geometric form factor of the foldable mobile device 401 is in the tent mode 402, the processor 416 executes instructions that cause the apparatus 400 (e.g., the foldable mobile device 401, which includes substantially the same components as the foldable mobile device form factor control module 405 (not shown), actuators 435 (not shown), and so forth corresponding to components described above with respect to FIG. 2) to perform lowering the pointing elevation angle PE of the one or more cameras 412 to facilitate maintaining the subject within the field of view by decreasing the hinge angle between the first device housing and the second device housing.

FIG. 5 is a side view illustration of an apparatus 500 including a foldable mobile device 501 configured in an interior facing stand mode form factor 502 and performing autonomous form factor control to maintain a forward or backward moving user 503 within a camera field of view by adjusting a pointing elevation angle PE of one or more cameras (which in this case is an interior camera 522 also sometimes referred to as a selfie camera) in response to a forward motion 509 or a backward motion 511 of the user 503.

In the example depicted in FIG. 5, the processor 516 of the foldable mobile device 501 causes the processor 516 perform sensing of a subject within the field of view of the one or more cameras (e.g., the interior cameras 422).

In response to sensing the forward motion 509 of the subject 503, the processor 516 executes instructions to perform raising a pointing elevation angle PE of the one or more cameras 512 to facilitate maintaining the subject 503 within the field of view by autonomously controlling the hinge angle H between the first device housing 504 and the second device housing 506.

As depicted, the letter H for the hinge angle is followed by the up arrow symbol ↑ as in H↑ indicating that, in response to determining that the selected geometric form factor of the foldable mobile device 501 is in the interior facing stand mode 502, the processor 416 executes instructions that cause the apparatus (e.g., the foldable mobile device 501) to perform raising the pointing elevation angle PE of the interior camera 522 (e.g., selfie camera) to facilitate maintaining the subject within the field of view by autonomously increasing the hinge angle H between the first device housing 504 and the second device housing 506.

Similarly, in response to the backward motion 511 of the subject, the processor 516 executes instructions that cause the apparatus 500 (e.g., the foldable mobile device 501, form factor control module 505 (not shown), actuators 535 (not shown), and so forth as described above with respect to FIG. 2) to perform lowering the pointing elevation angle PE of the interior camera 522 to facilitate maintaining the subject 503 within the field of view by autonomously decreasing the hinge angle H between the first device housing 504 and the second device housing 506.

FIG. 6 is a side view illustration of an apparatus 600 including a foldable mobile device 601 configured in an exterior facing stand mode form factor 602 and performing autonomous form factor control to maintain a forward or backward moving user 603 within a camera field of view by adjusting a pointing elevation angle PE of one or more exterior cameras 612 in response to a forward motion 609 or a backward motion 611 of the user 603.

Although some of the complexities for maintaining a subject within the field of view are present within the examples illustrated in FIG. 4 (the higher resolution exterior/main camera with more features is facing the user) and FIG. 5 (the interior/selfie camera facing with less features is facing the user), the overall movements of foldable mobile device in the examples of FIG. 4 and FIG. 5 are relatively similar in the sense that for both form factors, in response to a forward motion of a user, the foldable mobile device raises the camera pointing elevation angle by autonomously increasing the hinge angle between its own first and second device housings and in response to a backward motion of a user, the foldable mobile device lowers the camera pointing elevation angle by autonomously decreasing the hinge angle between its own first and second device housings.

The example of FIG. 6 starts out the same as in FIGS. 4 and 5 because in response to a forward motion 609 of the user 603, the foldable mobile device 601 autonomously raises the pointing elevation angle PE of the exterior camera 612 and in response to a backward motion 611 of the user 603 the foldable mobile device 601 autonomously lowers the PE of the exterior camera.

This might seem relatively simple to implement if it were able to be implemented primarily via software or optical method. But for reasons described above that cannot or has not been done.

However, because of the complexities associated with the direction of hinge rotation and camera field of view direction as described above with respect to FIG. 3, implementing the solution via autonomous physical motion of the foldable mobile device itself is more challenging that it might at first appear due to the need to respond with different directions of autonomous form factor control movements in response to the same external stimulus based on an "awareness" by the foldable mobile device of its own current form factor.

As can be seen from the illustrations in FIG. 6, in the exterior facing stand mode 602, in order to autonomously raise the pointing elevation angle PE of the exterior camera 612, in response to sensing a forward motion 609 of the user 603, the foldable mobile device 601 must autonomously decrease the hinge angle between the first device housing 604 and the second device housing 606. Similarly, in order to autonomously lower the pointing elevation angle PE of the exterior camera 612, in response to sensing a backward motion 611 of the user 603, the foldable mobile device 601 must autonomously increase the hinge angle between the first device housing 604 and the second device housing 606. Both of these autonomous control movements of the hinge angle H are in the opposite direction to those performed by the foldable mobile device 601 in the examples for the tent mode depicted in FIG. 4 or the interior facing stand mode depicted in FIG. 5. The implementations disclosed herein solve these form factor mode complexities not only for the hinge direction and camera field of view, but also for the actuator implementations which are described in more detail below with respect to FIGS. 7, 8A, 8B, and 8C.

FIG. 7 is a side view illustration of an apparatus 700 including a foldable mobile device 701 that performs autonomous form factor control using shape memory alloy actuators 735, according to one or more examples of the present disclosure;

In the depicted example, the foldable mobile device 701 is depicted as being positioned in a geometric form factor that is an exterior facing stand mode 702 with an L-shape for the one or more cameras are in the first device housing 704 on the exterior face opposite the interior flexible full-length display screen. In many foldable mobile devices such as the depicted foldable mobile device 701, the one or more exterior facing cameras are 712 the main camera(s) with the highest quality, resolution, and best features making such a foldable mobile device 701 in an exterior facing stand mode an ideal choice for use in videoconferencing rather than using a much lower quality PC webcam.

In various implementations, the foldable mobile device 701 includes a geometric form factor control module 705 that receives instructions from the processor 716 and output signals to one or more shape memory alloy (SMA) actuators 735. The signals cause an angular rotation that autonomously controls the hinge angle 'H' between the first device housing 704 and the second device housing 706 as indicated in the instruction.

In some implementations, the one or more SMA actuators are SMA coil springs that contract in response to an electrical signal and expand in response to an absence of the electrical signal.

In panel A of FIG. 7, with the foldable mobile device 701 in exterior facing stand mode 702, the SMA actuator 735 is initially in an expanded state because the first device housing 704 is pushed forward relative to a pivot point 727 e.g., near the axis of the hinge 708 (not shown) and the hinge angle H appears to be almost 90 degrees.

In response to the foldable mobile device 701 detecting a forward motion of a user in the field of view of the exterior camera 712 (also referred to as main camera) processor 716 communicates with the geometric form factor control module 705. The geometric form factor control module 705 causes electrical signals to be sent to the one or more shape memory alloy (SMA) actuators 735 to contract to cause an angular rotation that autonomously decreases the hinge angle between the first device housing 704 and the second device housing 706 as indicated in the instruction.

As described above with respect to FIG. 2, in various examples, the SMA actuators comprise one or more SMA springs that contract in response to an electrical signal and expand in response to an absence of the electrical signal or one or more SMA springs that expand in response to an electrical signal and contract in response to an absence of the electrical signal. The SMA actuators 735 may include other components known to those skilled artisan such as packaging, circuit boards, power components, connectors, and the like.

As depicted, in certain examples, the SMA actuators 735 are disposed within the second device housing 706 and are mechanically coupled to a portion of first device housing 704 that is offset from the hinge pivot axis 708 at a distance such that a predetermined force applied by expansion or contraction of the SMA actuators 735 causes a corresponding angular rotation that changes the hinge angle between the first device housing 704 and the second device housing 706.

Other mechanical coupling configurations of the SMA actuators 735 to the first and second device housings may be implemented by those of ordinary skill in the art based on the information and teachings of this disclosure.

In some implementations, a first SMA actuator 735a of the one or more SMA actuators 735 is disposed near a left edge of the foldable mobile device 701 and a second SMA actuator 735b of the one or more SMA actuators 735 is disposed near a right edge of the foldable mobile device 701. This provides a mechanism for force to be exerted independently on each side of the foldable mobile device 701 which gives more flexibility for more precision in controlling the amount of bias force when any combination of the first and second actuators SMA actuators 735a, 735b are both fully deactivated, both fully activated, both partially activated to different levels.

In various implementations, the one or more SMA actuators 735 comprise one or more SMA coil springs that contract in response to an electrical signal and expand in response to an absence of the electrical signal or one or more SMA coil springs that expand in response to an electrical signal and contract in response to an absence of the electrical signal.

As discussed above with respect to FIG. 6, in the exterior facing stand mode 702, autonomously decreasing the hinge angle the raises the pointing elevation angle PE of the exterior cameras 712 which as depicted in FIG. 7 controls the form factor so that the form factor of the foldable mobile device 701 is autonomously controlled from the position depicted in panel A to the position depicted in panel B meaning from the nearly horizontal pointing elevation angle PE depicted in panel A of FIG. 7 to the slightly upward pointing elevation angle PE of the exterior cameras 712 depicted in panel B.

The upward and downward pointing arrows on the left side of FIG. 7 are meant to graphically convey that as repeated forward and backward motion of a user is detected, the foldable mobile device 701 is enabled to autonomously control its form factor by sending signals that expand or contract the SMA actuators in the appropriate direction to maintain a user within the field of view based on the current form factor and the other factors described in this disclosure.

FIG. 8A is a side view illustration of an apparatus 800 including a foldable mobile device 801 that performs autonomous form factor control with external linear SMA actuators 835. As with the other Figures, unless otherwise clear from context, the structures and functions of the foldable mobile device 801 are substantially similar to the foldable mobile device 201 and its corresponding components described above with respect to FIG. 2.

The processor 816 determines the current form factor of the foldable mobile device 801 which as depicted is an exterior facing stand mode form factor. In response to detecting forward or backward motion of a user, the processor 816 sends instructions to the geometric form factor control module 805 sends control signals to cause one or more SMA actuators 835 to contract.

In certain implementations, at least a portion of the geometric form factor control module 805 may be implemented in a separate processor included in the external package with the SMA actuators 835. In such implementations, the foldable mobile device 801 may include a separate geometric form factor control module 805 or the processor 816 of the foldable mobile device 801 may communicate with the geometric form factor control module 805 included in the external package with the SMA actuators 835.

In the depicted implementation, the SMA actuators 235 are separately packaged from the foldable mobile device 801 and include coupling adapters 842a, 842b at each end of the SMA actuators 835 that removably couple to the first device housing 804 and the second device housing 806 at selected positions.

The up and down arrows near the coupling adapter 842a indicate that at least one coupling adapter 842 slides up and down as the SMA actuator 835 expands or contracts so that the first device housing 804 can pivotally rotate as the hinge angle H increases or decreases. The dark shading of the coupling adapter 842b indicates that at least one coupling adapter 842 does not slide as the SMA actuator 835 expands or contracts so that the force exerted by the SMA actuator 835 has a non-moving point to push or pull against.

In various implementations, the SMA actuators 835 further include an interface 825 such as a Bluetooth transceiver or any wired or wireless interface to communicate control signals from the foldable mobile device 801 to control the SMA actuators 835. In certain implementations, SMA actuators 835 include a power supply module 845 that includes a power source such as a rechargeable battery and associated circuitry to power the SMA actuators 835 and any interface 825 needed to communicate instructions and/or signals from the communication interface 824 of the foldable mobile device 801 to the SMA actuators 835. In certain implementations, at least one connection of the interface is included in at least one of the coupling adapters 842.

The upward and downward pointing arrows on the left side of FIG. 8A are meant to graphically convey that as repeated forward and backward motion of a user is detected, the foldable mobile device 801 is enabled to autonomously control its form factor by sending signals that expand or contract the SMA actuators 835 in the appropriate direction to maintain a user within the field of view based on the current form factor and the other factors described in this disclosure.

FIG. 8B is a side view illustration of an apparatus 820 which is a variation the apparatus 800 depicted in FIG. 8A. Instead of the coupling adapter 842b being positioned along a side of the second device housing 806, it couples along both sides and an end of the second device housing 806 to prevent slippage.

Figure 8C:
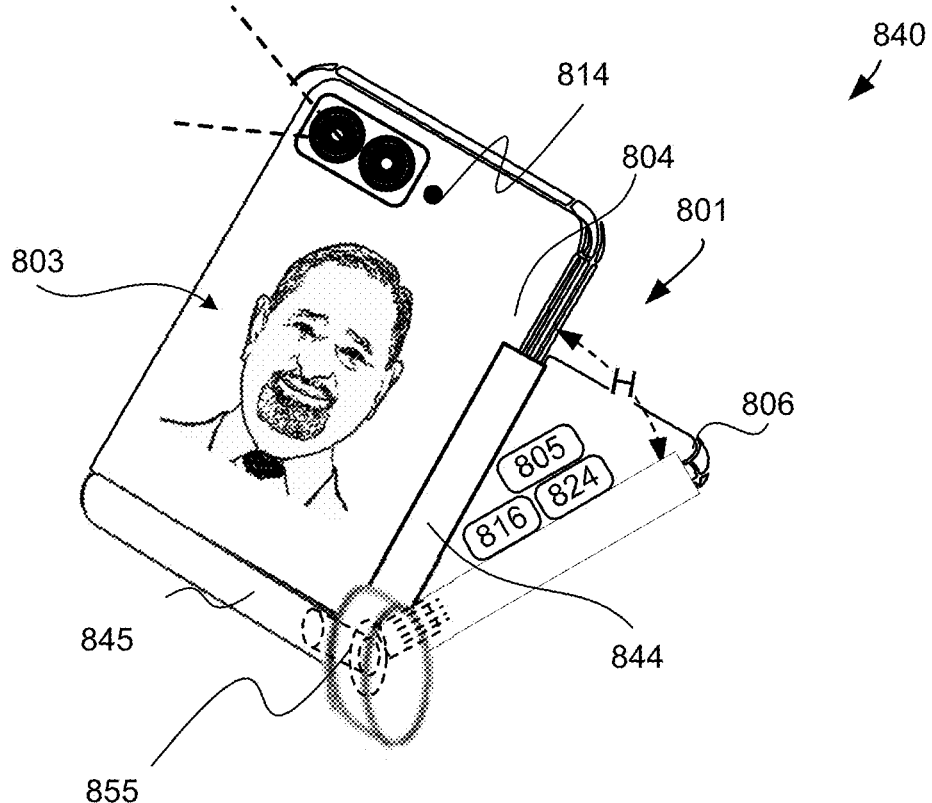
FIG. 8C is a side view illustration of an apparatus including a foldable mobile device that performs autonomous form factor control with an external rotary SMA actuator according to one or more examples of the present disclosure.

FIG. 8C is a side view illustration of an apparatus 840 including a foldable mobile device 801 that performs autonomous form factor control with an external rotary SMA actuator 835. The foldable mobile device 801 detects it current form factor and user motion substantially as described above with respect to FIGS. 4, 5, 6, 7, 8A and 8B using the structures and functions described substantially as described above with respect to FIGS. 8A and 8B.

However, with respect to the externally packaged SMA actuators, instead of linear SMA actuators 835 comprising springs that expand or contract in response to electrical signals, the apparatus 840 and the foldable mobile device 801 perform autonomous form factor control with an external rotary SMA actuator 855 that is coupled to pivoting arm members 844 and 846 that are coupled respectively to the first device housing 804 and second device housing 806 of the foldable mobile device 801 to autonomously control the hinge angle H based on signals from the geometric form factor control module 805 in response to instructions from the processor 816.

In other words, in such implementations, the apparatus 840 includes a geometric form factor control module 805 that in response to instructions from the processor 816 to cause an external rotary arm 844 coupled to the first device housing 804 to autonomously control the hinge angle between the first device housing 804 and the second device housing 806 as indicated in the instruction.

In certain examples, the apparatus 840 include an external rotary SMA actuator 835 coupled to the first device housing 804 that in response to an electrical signal generated in response to the instruction performs an angular rotation of the first device housing 804 as indicated in the instruction.

One source of a lightweight ultra slim precision rotary SMA actuator with many step positions per revolution is Cambridge Mechatronics, Block 5, The Westbrook Centre, Milton Rd, Cambridge, CB4 1YG, United Kingdom.

In various implementations, certain of the other external SMA actuator components such as the power supply module 845 and/or the interface 825 described with respect to FIG. 8A may be implemented with the rotary SMA actuator 855.

FIG. 9 is a schematic flow chart diagram illustrating a method 900 for autonomous form factor control of a foldable mobile device.

In various example implementations, the method 900 begins and includes sensing 902 a forward motion or a backward motion of a subject within a field of view of one or more cameras disposed in a first device housing that is selectively pivoted about a hinge to a hinge angle relative to a second device housing to foldably position the foldable mobile device into a selected geometric form factor for capturing video of a subject.

In one or more example implementations, 900 continues and includes (in response to the forward motion of the subject) raising 904 a pointing elevation angle of the one or more cameras to facilitate maintaining the subject within the field of view by autonomously controlling the hinge angle between the first device housing and the second device housing.

In certain example implementations, the method 900 continues and includes (in response to the backward motion of the subject) lowering 906 the pointing elevation angle of the one or more cameras to facilitate maintaining the subject within the field of view by autonomously controlling the hinge angle between the first device housing and the second device housing.

In some implementations, one or more steps of the method 900 may be performed in a different order than the order shown in FIG. 9 or in a different order than presented in this description of the method 900. However, the claims ought to be interpreted as covering any reasonable order. For example, whether the step of "raising 904 a pointing elevation angle of the one or more cameras to facilitate maintaining the subject within the field of view by autonomously controlling the hinge angle between the first device housing and the second device housing" is listed in the claim before or after the step of "lowering 906 the pointing elevation angle of the one or more cameras to facilitate maintaining the subject within the field of view by autonomously controlling the hinge angle between the first device housing and the second device housing" should not affect whether the claim applies to a particular situation With the completion of the above enumerated steps, method 900 has completed one set of steps and may end. In some implementations, the method 900 may continue and return to the act of sensing 902 forward or backward motion of the subject and subsequent act of raising 904 and lowering 906 the pointing elevation angle of the one or more cameras to facilitate subject tracking in response respectively to forward and backward motion of the subject.

In various implementations, one or more steps of the method 900 may be performed using portions or all of system 100 or of the apparatuses 200, 300, 400, 500, 600, 700, 800, 820, and 840 for autonomous form factor control of a foldable mobile device as disclosed above with respect to FIGS. 2, 4, 5, 6, 7, 8A, 8B, and/or 8C.

Figure 10:
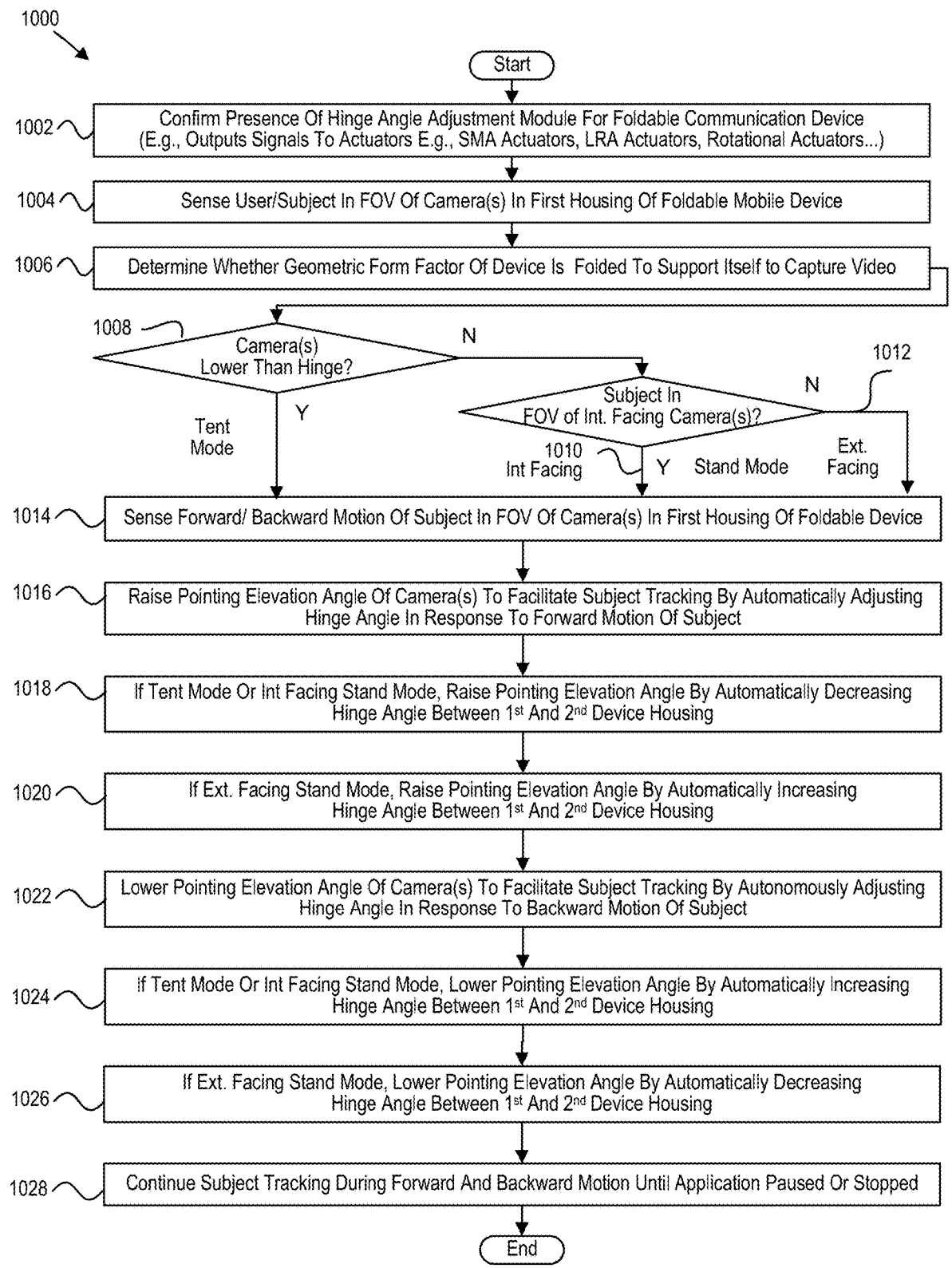
FIG. 10 is a schematic flow chart diagram illustrating another method for autonomous form factor control of a foldable mobile device according to one or more examples of the present disclosure.

FIG. 10 is a schematic flow chart diagram illustrating another method 1000 for autonomous form factor control of a foldable mobile device.

In various example implementations, the method 1000 begins and includes confirming 1002 a presence of a geometric form factor control module such as the geometric form factor control modules 105, 205 described above with respect to FIG. 1 and FIG. 2. The geometric form factor control modules 105, 205 output control signals to selected types of actuators used to perform raising or lowering the pointing elevation angle of one or more cameras in the first housing by autonomously controlling the hinge angle between the first device housing in the second device housing of the foldable mobile device.

For example, certain example implementations are disclosed that use shape memory alloy (SMA) actuators such as depicted and described above with respect to FIGS. 7, 8A-8C.

In other example implementations of the method 1000, the method 1000 is performed using other instances of one or more shape memory alloy actuators such as shape memory alloy actuators 835 depicted in FIG. 8A, 8B, or 8C that are implemented as externally coupled actuators.

The act of confirming 1002 the presence of the geometric form factor control module may depend upon whether the geometric form factor control module is incorporated as a factory integrated module of the foldable mobile device or whether it is implemented as an accessory to which the foldable mobile device is coupled after assembly.

In various examples, the method 1000 continues and includes sensing 1004 presence of the user or subject within a field of view of one or more cameras in the first device housing of the foldable mobile device.

The method 1000 continues and includes determining 1006 whether the geometric form factor of the foldable mobile device is folded to support itself to capture video. In other words, whether the geometric form factor of the foldable mobile device has a form factor such as a tent mode that acts as a camera bipod or has a form factor such as stand mode that acts as a camera stand.

To do this, processor executes instructions that cause it to determine that the selected geometric form factor of the foldable mobile device is in a tent mode with an inverted V-shape based on sensor information indicating that one or more cameras are oriented lower than the hinge.

The method 1000 continues and includes executing instructions that cause it to determine 1010 that the geometric form factor of the foldable mobile device is in an interior facing stand mode with an L-shape based on sensor information indicating that one or more cameras are oriented higher than the hinge and that the subject is in the field of view of a camera of the one or more cameras on the interior face of the first device housing or to determine 1012 that the geometric form factor of the foldable mobile device is the exterior facing stand mode if the subject is in the field of view of an exterior camera and the one or more cameras are oriented higher than the hinge.

The method 1000 continues and includes sensing 1014 a forward motion or a backward motion of a subject within a field of view of one or more cameras disposed in a first device housing of a foldable mobile device that is pivotally maintained at a hinge angle relative to a second device housing via a hinge.

The method 1000 continues and includes in response to the forward motion of the subject, raising 1016 a pointing elevation angle of the one or more cameras to facilitate maintaining the subject within the field of view by autonomously controlling the hinge angle between the first device housing and the second device housing; and in response to the backward motion of the subject, lowering the pointing elevation angle of one or more cameras to facilitate maintaining the subject within the field of view by autonomously controlling the hinge angle between the first device housing and the second device housing.

The method of claim 1, further comprising determining whether the foldable mobile device is in tent mode in response to sensor information from the foldable mobile device indicating that the foldable mobile device is oriented to have a geometric form factor with an inverted V-shape.

The method of claim 2, wherein the sensor information comprises information indicating that the hinge angle is less than 90 degrees and that the first device housing is oriented such that the one or more cameras are vertically disposed lower than the hinge.

The method of claim 2, wherein in response to determining that the foldable mobile device is in a tent mode, raising the pointing elevation angle of the one or more cameras to facilitate maintaining the subject within the field of view by autonomously controlling the hinge angle between the first device housing and the second device housing comprises increasing the hinge angle between the first device housing and the second device housing.

The method of claim 2, wherein in response to determining that the foldable mobile device is in the tent mode, lowering the pointing elevation angle of the one or more cameras to facilitate maintaining the subject within the field of view by autonomously controlling the hinge angle between the first device housing and the second device housing comprises decreasing the hinge angle between the first device housing and the second device housing.

The method of claim 1, further comprising determining whether the foldable mobile device is a stand mode in response to sensor information from the foldable mobile device indicating that the foldable mobile device is oriented to have a geometric form factor with an L-shape in which the one or more cameras in the first device housing are held at an at least partially vertical angle that is horizontally supported by the second device housing.

The method of claim 6, further comprising determining whether the one or more cameras detecting the subject are interior facing or exterior facing based on predetermined camera configuration parameters.

The method of claim 7, wherein in response to determining that one or more cameras detecting the subject are interior facing:
  raising the pointing elevation angle of the one or more cameras by adjusting the hinge angle comprises increasing the hinge angle between the first device housing and the second device housing; and
  lowering the pointing elevation angle of the one or more cameras by adjusting the hinge angle comprises decreasing the hinge angle between the first device housing and the second device housing.

The method of claim 7, wherein in response to determining that one or more cameras detecting the subject are exterior facing:
  raising the pointing elevation angle of the one or more cameras by adjusting the hinge angle comprises increasing the hinge angle between the first device housing and the second device housing; and lowering the pointing elevation angle of the one or more cameras by adjusting the hinge angle comprises decreasing the hinge angle between the first device housing and the second device housing.

Examples may be practiced in other specific forms. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a foldable mobile device comprising:
a first device housing that is selectively pivotable about a hinge to a hinge angle relative to a second device housing for foldably positioning the foldable mobile device into a plurality of geometric form factors for capturing video of a subject;
an exterior display and one or more cameras in the first device housing including at least one exterior camera;
an interior display that stretches across an interior face of first device housing and the second device housing;
a processor; and a memory coupled to the processor, the memory comprising instructions executable by the processor to cause the apparatus to perform:
sensing a forward motion or a backward motion of the subject within a field of view of the one or more cameras in the first device housing;
in response to sensing the forward motion of the subject, raising a pointing elevation angle of the one or more cameras to facilitate maintaining the subject within the field of view by autonomously controlling the hinge angle between the first device housing and the second device housing; and
in response to the backward motion of the subject, lowering the pointing elevation angle of the one or more cameras to facilitate maintaining the subject within the field of view by autonomously controlling the hinge angle between the first device housing and the second device housing.

2. The apparatus of claim 1, wherein the processor is further caused to perform determining that a selected geometric form factor of the plurality of geometric form factors of the foldable mobile device:
is in a tent mode with an inverted V-shape based on sensor information indicating that the one or more cameras are oriented lower than the hinge; and
is in an interior facing stand mode with an L-shape based on sensor information indicating that the one or more cameras are oriented higher than the hinge and that the subject is in the field of view of the one or more cameras on the interior face of the first device housing.

3. The apparatus of claim 2, wherein the processor, in response to determining that the selected geometric form factor of the foldable mobile device is in the tent mode or the interior facing stand mode performs:
raising the pointing elevation angle of the one or more cameras to facilitate maintaining the subject within the field of view by increasing the hinge angle between the first device housing and the second device housing; and
lowering the pointing elevation angle of the one or more cameras to facilitate maintaining the subject within the field of view by decreasing the hinge angle between the first device housing and the second device housing.

4. The apparatus of claim 2, wherein the processor further determines that the selected geometric form factor of the foldable mobile device is an exterior facing stand mode with an L-shape based on sensor information indicating that:
the one or more cameras are oriented higher than the hinge; and
the subject is within the field of view of the one or more cameras in an exterior face of the first device housing.

5. The apparatus of claim 2, wherein the processor, in response to determining that the selected geometric form factor of the foldable mobile device is in the tent mode or the interior facing stand mode performs:
raising the pointing elevation angle of the one or more cameras to facilitate maintaining the subject within the field of view by decreasing the hinge angle between the first device housing and the second device housing; and
lowering the pointing elevation angle of the one or more cameras to facilitate maintaining the subject within the field of view by increasing the hinge angle between the first device housing and the second device housing.

6. The apparatus of claim 1, further comprising a geometric form factor control module that in response to instructions from the processor autonomously controls the hinge angle between the first device housing and the second device housing as indicated in the instruction by sending an electrical signal to one or more shape memory alloy actuators that apply a force to the first device housing.

7. The apparatus of claim 6, further comprising an external rotary SMA actuator coupled to the first device housing that in response to the electrical signal generated in response to the instructions performs an angular rotation of the first device housing as indicated in the instructions.

8. The apparatus of claim 6, wherein the one or more SMA actuators comprise:
one or more SMA springs that contract in response to the electrical signal and expand in response to an absence of the electrical signal; or
one or more SMA springs that expand in response to the electrical signal and contract in response to an absence of the electrical signal.

9. The apparatus of claim 6, wherein a first SMA actuator of the one or more SMA actuators is disposed near a left edge of the foldable mobile device and a second SMA actuator of the one or more SMA actuators is disposed near a right edge of the foldable mobile device.

10. The apparatus of claim 7, wherein the one or more SMA actuators are disposed within the second device housing and are mechanically coupled to a portion of first device housing at a distance offset from a pivot axis hinge such that the force of expansion or contraction of the SMA actuators applies a torque to the first device housing that changes the hinge angle between the first device housing and the second device housing.

11. The apparatus of claim 6, wherein the one or more SMA actuators are separately packaged from the foldable mobile device and further comprise:
a set of coupling adapters at opposite ends of the SMA actuators that removably couple to the first device housing and the second device housing at selected positions; and
an interface to communicate power and/or signals from the foldable mobile device to the SMA actuators.

12. The apparatus of claim 11, further comprising a power supply module, wherein the interface to communicate signals from the foldable mobile device to the one or more SMA actuators comprises a wireless interface.

13. The apparatus of claim 11, wherein a coupling adapter of the set of set of coupling adapters comprises at least a portion of the interface to communicate power and/or signals from the foldable mobile device to the SMA actuators.

14. A method for autonomous form factor control of a foldable mobile device, the method comprising:
sensing a forward motion or a backward motion of a subject within a field of view of one or more cameras disposed in a first device housing that is selectively pivoted about a hinge to a hinge angle relative to a second device housing to foldably position the foldable mobile device into a selected geometric form factor for capturing video of the subject;
in response to the forward motion of the subject, raising a pointing elevation angle of the one or more cameras to facilitate maintaining the subject within the field of view by autonomously controlling the hinge angle between the first device housing and the second device housing; and
in response to the backward motion of the subject, lowering the pointing elevation angle of the one or more cameras to facilitate maintaining the subject within the field of view by autonomously controlling the hinge angle between the first device housing and the second device housing.

15. The method of claim 14, further comprising determining that the selected geometric form factor of the foldable mobile device:
is in a tent mode with an inverted V-shape based on sensor information indicating that the one or more cameras are oriented lower than the hinge;
is in an interior facing stand mode with an L-shape based on sensor information indicating that the one or more cameras are oriented higher than the hinge and that the subject is in the field of view of a camera of the one or more cameras on an interior face of the first device housing; and
is in an exterior facing stand mode with an L-shape based on sensor information indicating that the one or more cameras are oriented higher than the hinge and that the subject is in the field of view of at least one of the one or more cameras on an exterior face of the first device housing.

16. The method of claim 15, further comprising:
in response to determining that the selected geometric form factor of the foldable mobile device is in the tent mode or the interior facing stand mode:
raising the pointing elevation angle of the one or more cameras to facilitate maintaining the subject within the field of view by increasing the hinge angle between the first device housing and the second device housing;
lowering the pointing elevation angle of the one or more cameras to facilitate maintaining the subject within the field of view by decreasing the hinge angle between the first device housing and the second device housing;
in response to determining that the selected geometric form factor of the foldable mobile device is in the exterior facing stand mode:
raising the pointing elevation angle of the one or more cameras to facilitate maintaining the subject within the field of view by decreasing the hinge angle between the first device housing and the second device housing; and
lowering the pointing elevation angle of the one or more cameras to facilitate maintaining the subject within the field of view by increasing the hinge angle between the first device housing and the second device housing.

17. The method of claim 16, wherein adjusting the hinge angle between the first device housing and the second device housing comprises electrically controlling one or more shape memory alloy (SMA) actuators to move in a direction that causes the first device housing to pivotally rotate relative to the second device housing.

18. The method of claim 17, wherein the one or more SMA actuators are separately packaged from the foldable mobile device.

19. The method of claim 17, wherein the one or more SMA actuators comprise a rotary SMA actuator.

20. A system comprising:
a foldable mobile device that is foldably positionable into a plurality of geometric form factors for capturing video of a subject, the foldable mobile device comprising;
a communication interface that connects to a large format display;
a flexible display that stretches across a first device housing and a second device housing;
a quick view display on an exterior face the first device housing with one or more hi-res cameras that enable a hi-res image of the subject in front of the hi-res cameras to be concurrently displayed on the quick view display and communicated to the large format display;
one or more shape memory alloy (SMA) actuators that linearly expand or contract to cause an angular rotation that autonomously controls a hinge angle between the first device housing and the second device housing;
a processor with a memory comprising executable code that causes that processor to perform:
determining a selected geometric form factor of the foldable mobile device;
sensing a forward motion or a backward motion of the subject within a field of view of the one or more hi-res cameras;
in response to the forward motion of the subject, raising a pointing elevation angle of the one or more hi-res cameras facing the subject to facilitate maintaining the subject within the field of view by causing the processor to generate signals that cause the SMA actuators to autonomously control the hinge angle in a first direction that raises the pointing elevation angle based on the selected geometric form factor; and
in response to the backward motion of the subject, lowering the pointing elevation angle of the one or more hi-res cameras facing the subject to facilitate maintaining the subject within the field of view by causing the processor to generate signals that cause the SMA actuators to autonomously control the hinge angle in a second direction that lowers the pointing elevation angle based on the selected geometric form factor.

\* \* \* \* \*